(12) United States Patent
Taniguchi et al.

(10) Patent No.: US 7,513,577 B2
(45) Date of Patent: Apr. 7, 2009

(54) MOTION CONTROL APPARATUS FOR VEHICLE

(75) Inventors: Masahiko Taniguchi, Kariya (JP); Kazuhiro Kato, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 556 days.

(21) Appl. No.: 11/208,576

(22) Filed: Aug. 23, 2005

(65) Prior Publication Data

US 2006/0055237 A1   Mar. 16, 2006

(30) Foreign Application Priority Data

Sep. 1, 2004   (JP)   ............................ 2004-254660

(51) Int. Cl.
B60T 8/24   (2006.01)
(52) U.S. Cl. ........................................ 303/146; 303/190
(58) Field of Classification Search ................ 303/140, 303/143, 146, 190; 701/71, 72, 81–83
See application file for complete search history.

(56) References Cited

U.S. PATENT DOCUMENTS 5,862,503 A * 1/1999 Eckert et al. .................. 701/78
7,125,086 B2 * 10/2006 Tanaka et al. ............... 303/190
2004/0267427 A1 * 12/2004 Suzuki et al. ................. 701/69

FOREIGN PATENT DOCUMENTS

JP   2003-182556   7/2003

* cited by examiner

Primary Examiner—Christopher P Schwartz
(74) Attorney, Agent, or Firm—Buchanan Ingersoll & Rooney PC

(57) ABSTRACT

A motion control apparatus for a vehicle can perform vehicle stability control. The apparatus determines that the vehicle is experiencing spin tendency when it detects a driver's specific operation that induces spin tendency and then detects a specific behavior representing spin tendency of the vehicle, and changes the conditions for initiating the vehicle stability control such that the control is initiated more easily. The specific operation may be an excessive steering operation in the turning direction or a load moving operation which increases the load acting on the front wheels. The specific behavior may be disagreement between behavior of steering angle and behavior of actual yaw rate of the vehicle. Accordingly, the occurrence of relatively slow spin tendency caused by the above "specific operation" can be detected with certainty. Further, upon detection of spin tendency, vehicle stability control is early initiated and executed, whereby stability of the vehicle is maintained.

20 Claims, 12 Drawing Sheets

MOTION CONTROL APPARATUS FOR VEHICLE

BACKGROUND OF THE INVENTION

1. Field of the Invention

The present invention relates to a motion control apparatus for a vehicle, in particular, to a motion control apparatus that executes vehicle stabilization control by imparting braking force to at least one wheel of a vehicle in order to generate a yawing moment in a direction opposite the vehicle's yawing direction, when the vehicle is in a state of over-steering or when the vehicle is experiencing spin tendency.

2. Description of the Related Art

Conventionally, vehicle motion control apparatuses are known that execute the above-described vehicle stabilization control when a vehicle is in a state of over-steering. A conventional motion control apparatus determines that the vehicle is in a state of over-steering when, for example, the difference (hereinafter referred to as "yaw rate deviation") between the actual yaw rate of the vehicle obtained from a yaw rate sensor (hereafter referred to as "actual yaw rate") and the vehicle yaw rate calculated from the steering angle, vehicle body speed, vehicle specifications, and the like (hereafter referred to as "steering angle yaw rate") exceeds a predetermined threshold value. The apparatus then executes the aforementioned vehicle stabilization control (i.e., over-steering suppression control) that imparts a predetermined braking force, by means of brake hydraulic pressure, to the wheel on the outer side of a turning locus. Further, another motion control apparatus recited in Japanese Patent Application Laid-Open (kokai) No. 2003-182556 is also known.

Nonetheless, in cases where, for example, a vehicle is traveling on a low-μ road surface whose friction coefficient is relatively low, and the driver performs an excessively large steering operation in the turning direction, the vehicle first goes into a state of under-steering. After that, the rear wheels slip towards the outer side of the turning locus, which is caused by the generation of a yawing moment in the turning direction of the vehicle, and in some cases, a relatively slow spin tendency occurs in the vehicle. As a result, the vehicle shifts from the state of under-steering to a state of over-steering.

Moreover, when the driver releases the accelerator pedal or steps on the brake pedal in a state where the centrifugal force acting on the vehicle in the middle of turning travel is great to the extent that it is substantially equal to the greatest cornering force that can be generated by the tires (hereafter referred to as "limit turning state"), the load acting on the wheels of the front side of the vehicle increases. Due to this, the load applied to the wheels of the rear side of the vehicle decreases, and the greatest cornering force that can be generated by the rear wheels lowers. As a result, in some cases, the rear wheels slip towards the outer side of the turning locus due to centrifugal force, so that a relatively slow spin tendency occurs in the vehicle. As a result, the vehicle goes into a state of over-steering.

When such spin tendency occurs in the vehicle, in order to maintain the stability of the vehicle, it is preferable to detect the generation of spin tendency, and early initiate and execute the above-described vehicle stabilization control. Nonetheless, in cases where a relatively slow spin tendency is generated, the increasing speed of the above-described yaw rate deviation is typically small. As a result, the yaw rate deviation does not exceed the aforementioned threshold value at an early stage after generation of such spin tendency. Accordingly, there has been a problem in that the vehicle stabilization control cannot be initiated early enough.

In other words, if the generation of relatively slow spin tendency as described above can be detected with certainty, vehicle stabilization control can be initiated at an early stage. For this reason, there is a need for detecting with certainty the generation of spin tendency, in response to which the vehicle stabilization control (over-steering suppression control) must be started at an early stage.

SUMMARY OF THE INVENTION

In view of the forgoing, an object of the present invention is to provide a motion control apparatus for a vehicle which can detect with certainty the generation of spin tendency, in response to which vehicle stabilization control (over-steering suppression control) must be started at an early stage.

The present invention provides a motion control apparatus for a vehicle (hereinafter referred to as "vehicle motion control apparatus") which comprises specific operation determining means, specific behavior determining means, spin tendency determining means, and stabilization control executing means. Hereafter, these means will be explained in this order.

Firstly, the specific operation determining means is a means that determines whether a specific operation by the driver has been performed that induces spin tendency of the vehicle. Here, it is preferable that the specific operation determining means be configured such that it determines the specific operation has been performed when the turning state of the vehicle becomes a state of under-steering due to driver's excessive steering operation in the turning direction.

Further, it is preferable that the specific operation determining means be configured such that it determines the specific operation has been performed when a load moving operation by the driver is performed that increases the load acting on the wheels of the front side of the vehicle body. Examples of the load moving operation include driver's operation of releasing the accelerator pedal and driver's operation of stepping on the brake pedal. When these specific operations are performed by the driver, as described above, spin tendency (especially relatively slow spin tendency) is induced in the vehicle.

It should be noted that the term spin tendency refers to a tendency where a vehicle spins due to the slipping of the rear wheels towards the outer side of the turning locus. Here, a state of over-steering is defined as a state where a value obtained by subtracting the above steering angle yaw rate from the above actual yaw rate (i.e., the above yaw rate deviation) exceeds a predetermined positive threshold value; and a state of under-steering is defined as a state where the yaw rate deviation becomes smaller than a predetermined negative threshold value. In this case, the above spin tendency can occur even if the vehicle is in a state of under-steering or over-steering. In other words, spin tendency refers to the tendency for a vehicle to move from a state of under-steering to a state of over-steering when the vehicle is in a state of under-steering, and it also refers to the tendency for the degree of over-steering to increase when the vehicle is in a state of over-steering.

Next, the specific behavior determining means is a means that determines whether a specific behavior indicating the above vehicle spin tendency has occurred in the vehicle. Here, it is preferable that the specific behavior determining means be configured such that it determines the specific behavior has occurred in the vehicle when it detects a state where the behavior of the steering operation by the driver and the behavior of the yaw rate of the vehicle are in disagreement with each other.

Generally, the yaw rate of a vehicle increases gradually when spin tendency occurs in the vehicle. At this time, the driver often steers in a direction that suppresses the increasing yaw rate (a direction that returns the position of the steering wheel, that has been steered toward the turning direction from the neutral position, to the neutral position) in order to prevent spin or maintains the position of the steering wheel. This results in that the behavior of the steering operation by the driver and the behavior of the yaw rate of the vehicle are in disagreement with each other.

Accordingly, by virtue of the above-described configuration; i.e., through detection of the state where the behavior of the steering operation by the driver and the behavior of the yaw rate are in disagreement with each other, a specific behavior in the vehicle indicating spin tendency of the vehicle can be determined to have occurred in the vehicle.

In this case, it is preferable that the specific behavior determining means is configured to determine that the specific behavior has occurred in the vehicle when the specific behavior determining means has detected a state in which the turning angle of the steerable wheel of the vehicle is becoming smaller due to a steering operation by the driver and the yaw rate of the vehicle is maintained to be substantially constant or a state in which the turning angle of the steerable wheel is maintained to be substantially constant due to a steering operation by the driver and the vehicle yaw rate is increasing.

As described above, in a case where spin tendency occurs in the vehicle, when the driver steers in a direction to suppress the increase in yaw rate in order to prevent a spin, the turning angle of the steerable wheels of the vehicle becomes smaller, and the yaw rate of the vehicle is be maintained to be substantially constant. Further, when the driver steers so as to maintain the position of the steering wheel, the turning angle of the steerable wheels is maintained so as to be substantially constant, and the vehicle yaw rate increases. Accordingly, with the above configuration, it can be determined more accurately whether a specific behavior indicating vehicle spin tendency has occurred in the vehicle.

Next, the spin tendency determining means is a means that determines that the vehicle is experiencing the spin tendency when the means has determined that the specific behavior has occurred in the vehicle after determining that a specific operation by the driver was performed.

When the specific operation has been performed by the driver as described above, spin tendency (especially relatively slow spin tendency) can occur in the vehicle thereafter, and as a result, the specific behavior occurs in the vehicle. In other words, the detection of the specific operation by the driver and the specific behavior in this order means that spin tendency (especially relatively slow spin tendency) has occurred in the vehicle. Accordingly, by virtue of the above configuration, the occurrence of spin tendency, in response to which the above-described vehicle stabilization control (over-steering suppression control) must be early initiated, can be detected with certainty.

Finally, the stabilization control executing means is a means that executes vehicle stability control that imparts braking force to at least one predetermined wheel of the vehicle in order to generate a yawing moment in the direction opposite the yawing direction of the vehicle when the vehicle is determined to be experiencing spin tendency. Due to this, vehicle stabilization control (over-steering suppression control) can be immediately initiated and executed when it has been determined by the spin tendency determining means that the vehicle is experiencing spin tendency. Accordingly, vehicle stabilization control can be initiated early when relatively slow spin tendency, such as that described above, occurs.

Further, an alternative vehicle motion control apparatus of the present invention comprises, in addition to the above specific operation determining means, specific behavior determining means, spin tendency determining means, and stabilization control executing means, over-steering degree obtaining means that obtains a value indicating the degree of over-steering when the vehicle is in a state of turning. Here, the value indicating the degree of over-steering is, for example, the above yaw rate deviation (i.e., the value obtained by subtracting the steering angle yaw rate from the actual yaw rate) but is not limited thereto.

Here, the stabilization control executing means is configured so as to execute the vehicle stabilization control when a value indicating the degree of over-steering exceeds a threshold value, instead of when the vehicle is determined to be experiencing spin tendency. Moreover, the alternative motion control apparatus further comprises threshold value lowering means that reduces the threshold value when the vehicle is determined to be experiencing spin tendency.

Due to this, vehicle stabilization control is initiated and executed when the value indicating the degree of over-steering (e.g., the above yaw rate deviation) exceeds the above threshold value.

Further, when it has been determined by a spin tendency determining means that the vehicle is experiencing spin tendency, after that the degree of over-steering in the vehicle (and thus, the value indicating the degree of over-steering) increases. In the meantime, by virtue of the above-described configuration, the threshold value decreases when the vehicle is determined to be experiencing spin tendency. Accordingly, when the vehicle is determined to be experiencing spin tendency, it becomes easier for the value indicating the degree of over-steering (e.g., the above yaw rate deviation) to exceed the above threshold value, as compared to the case where the vehicle is not determined to be experiencing spin tendency. As a result, the above vehicle stabilization control can be initiated early when spin tendency such as the relatively slow spin tendency occurs.

In this case, it is preferable that the threshold value lowering means be configured so as to change the degree, to which the threshold value is lowered, in accordance with the degree of spin tendency of the vehicle represented by the specific behavior. Here, the degree of spin tendency of the vehicle represented by the specific behavior is, for example, a continuation time of the specific behavior, although it is not limited thereto.

The greater the degree of spin tendency of the vehicle represented by the specific behavior becomes, the greater the degree of demand for early initiating vehicle stabilization control becomes. Accordingly, by virtue of the above-described configuration, the degree to which the threshold value is lowered, is increased in accordance with the increase in the degree of spin tendency of the vehicle represented by the specific behavior (i.e., the threshold value can be made to be even smaller). Therefore, the threshold value can be set to an appropriate value in accordance with the degree of spin tendency of the vehicle.

Moreover, the alternative motion control apparatus of the present invention further comprises vehicle body slip angle obtaining means that obtains the vehicle body slip angle of the vehicle. It is preferable that the apparatus be configured such that, in a case where it has been determined that the vehicle is experiencing spin tendency, the stabilization control executing means initiates and executes vehicle stabilization control when the vehicle body slip angle increases, even when the value indicating the degree of over-steering is not greater than the threshold value lowered by the threshold value lowering means. Here, the term vehicle body slip angle refers to the angle between the fore-aft direction of the vehicle body and the heading direction of the vehicle body.

In this case, more preferably, the stabilization control executing means is configured such that in a case where the vehicle has been determined to be experiencing spin tendency, the stabilization control executing means initiates and executes the vehicle stabilization control when the vehicle body slip angle increases by a predetermined amount from the vehicle body slip angle obtained when the value indicating the degree of over-steering has exceeded a value which is smaller by a predetermined amount than the threshold value lowered by the threshold value lowering means (e.g., a value half the threshold value).

In the alternative motion control apparatus of the present invention, the threshold value is lowered when the vehicle is determined to be experiencing spin tendency. However, in a case where, for example, the driver performs steering such that the steering angle yaw rate approaches the actual yaw rate, in some cases, the value indicating the degree of over-steering (e.g., the above yaw rate deviation) does not exceed the threshold value lowered by the lowering means. It is preferable that the motion control apparatus of the present invention be configured such that, even in such a situation, vehicle stabilization control can be initiated and executed in order to maintain the stability of the vehicle.

Meanwhile, the vehicle body slip angle can become a value directly indicating vehicle spin tendency. Further, the vehicle body slip angle increases gradually when vehicle spin tendency occurs.

Thus, when the apparatus of the present invention is configured as described above such that even if the value indicating the degree of over-steering does not exceed the threshold value lowered by the lowering means, the vehicle stabilization control can be initiated and executed when vehicle body slip increases, the stability of the vehicle can be maintained with further certainty.

It should be noted that the actual vehicle body slip angle cannot be directly detected. Accordingly, the vehicle body slip angle is generally obtained as an estimated vehicle body slip angle obtained by time integrating the differences between the vehicle yaw rate calculated from the lateral acceleration and vehicle body speed of the vehicle (hereafter, "lateral acceleration yaw rate") and the actual yaw rate.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 5 is a flowchart showing a routine executed by the CPU shown in FIG. 1 for calculating the wheel speed and the like;

DETAILED DESCRIPTION OF THE PREFERRED EMBODIMENT

Figure 1:
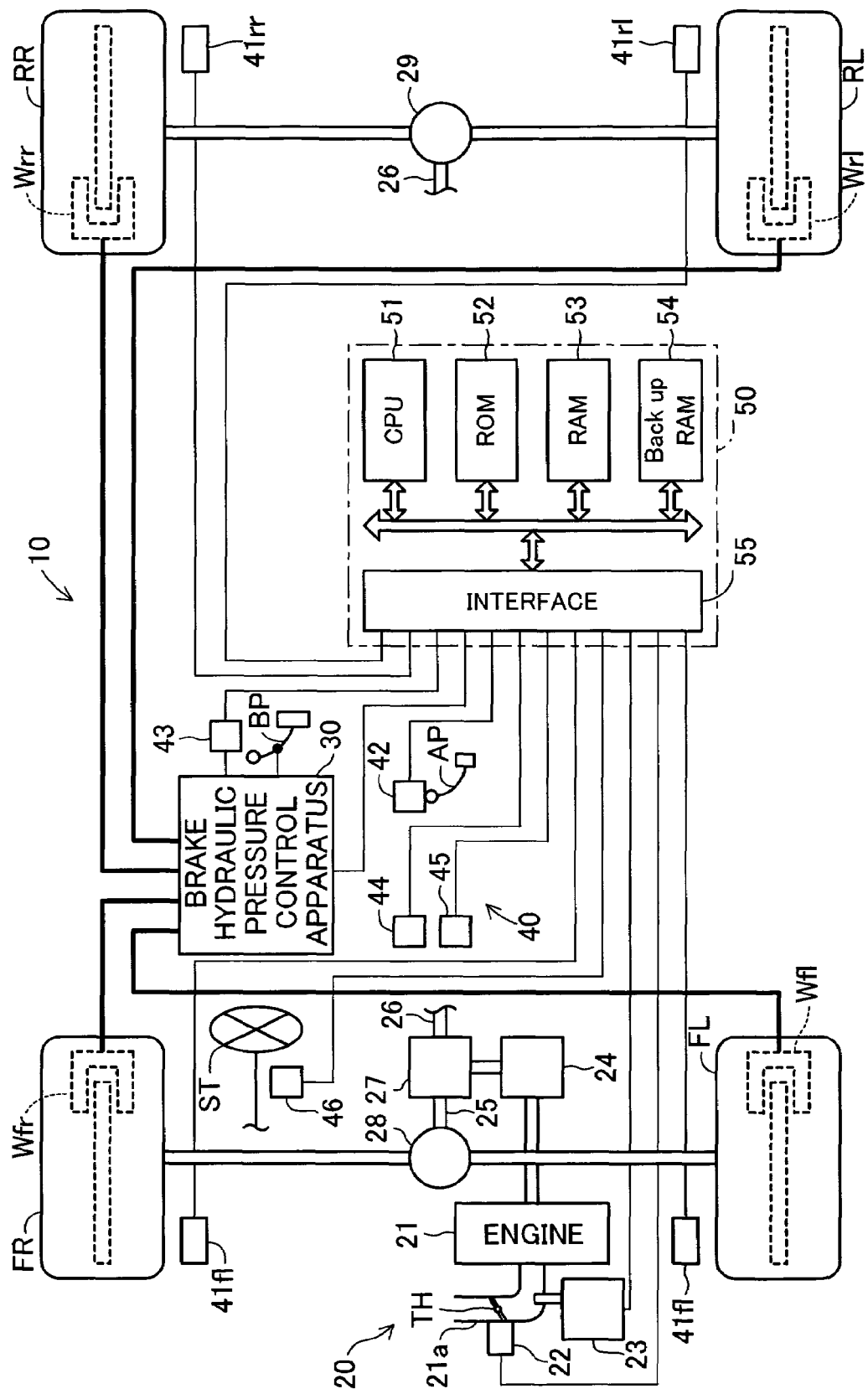
FIG. 1 is a schematic structural diagram of a vehicle with a vehicle motion control apparatus of an embodiment of the present invention.

Below, a motion control apparatus for a vehicle according to an embodiment of the present invention will be described while referring to the drawings. FIG. 1 schematically illustrates a vehicle on which a vehicle motion control apparatus 10 according to the embodiment of the present invention is mounted. The illustrated vehicle is a four-wheel drive vehicle whose four wheels are all driven wheels.

This vehicle motion control apparatus 10 has a drive force transmission mechanism section 20 which generates a drive force and transmits it to the drive wheels FL, FR, RL, and RR; a brake hydraulic pressure control apparatus 30 for generating a braking force in each wheel by brake hydraulic pressure; a sensor section 40 comprising various sensors; and an electronic controller 50.

The drive force transmission mechanism section 20 comprises an engine 21 which generates a drive force; a throttle valve actuator 22 comprising a DC motor which controls the opening of a throttle valve TH which is disposed in the intake pipe 21a of the engine 21 and which varies the open cross-sectional area of the intake passage; a fuel injection apparatus 23 which includes unillustrated fuel injectors which spray fuel in the vicinity of unillustrated intake ports of the engine 21; and a transmission 24 whose input shaft is connected to the output shaft of the engine 21.

The drive force transmission mechanism section 20 comprises a transfer 27 which receives the drive force from the output shaft of the transmission 24, and properly distributes and transmits the drive force to a front-wheel-side propeller shaft 25 and a rear-wheel-side propeller shaft 26; a front-wheel-side differential 28 which receives the front-wheel-side drive force from the front-wheel-side propeller shaft 25, and properly distributes and transmits the front-wheel-side drive force to the front wheels FL and FR; and a rear-wheel-side differential 29 which receives the rear-wheel-side drive force from the rear-wheel-side propeller shaft 26, and properly distributes and transmits the rear-wheel-side drive force to the rear wheels RR and RL.

Figure 2:
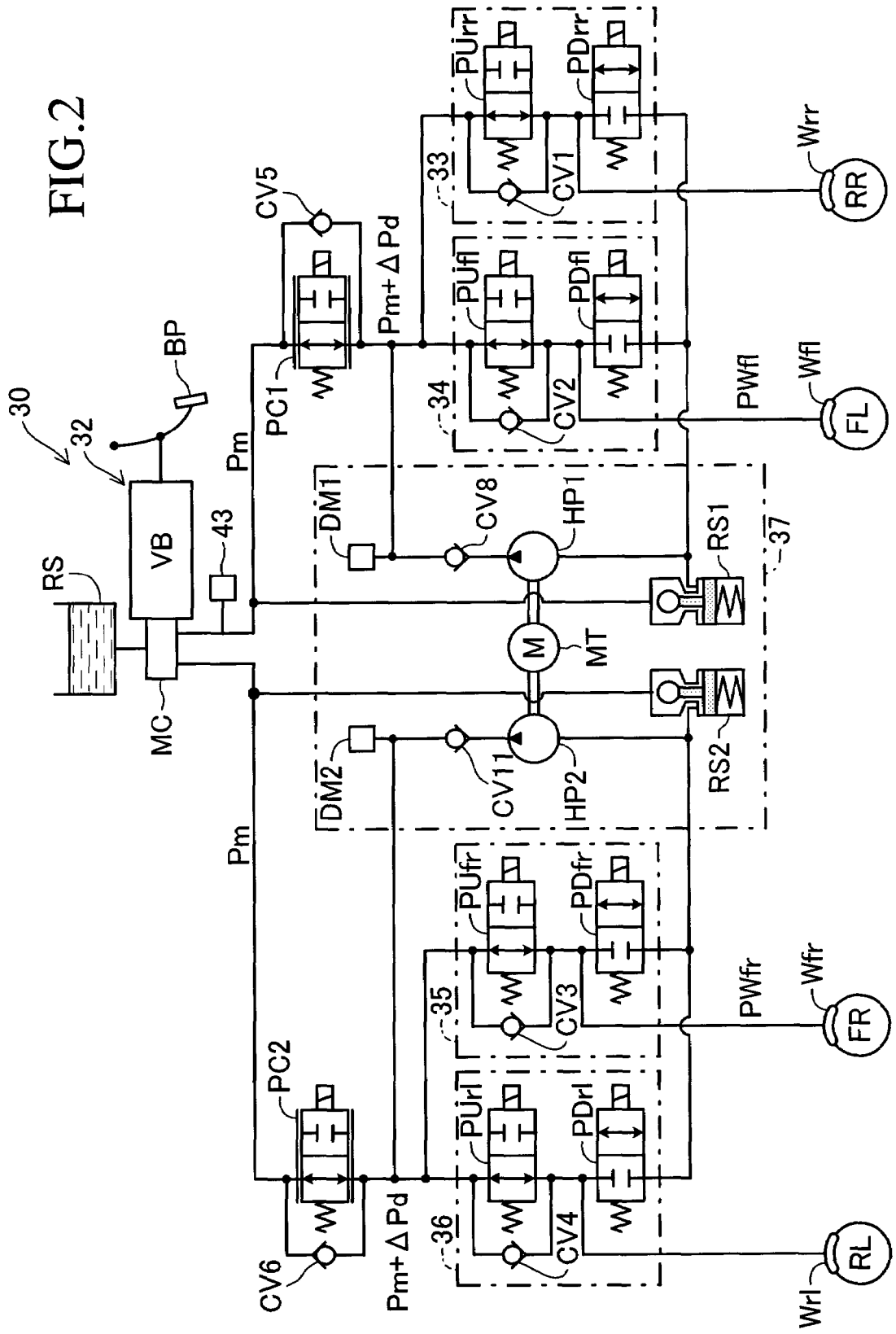
FIG. 2 is a schematic structural diagram of the brake hydraulic pressure control apparatus shown in FIG. 1.

As schematically shown in FIG. 2, the brake hydraulic pressure control apparatus 30 includes a brake hydraulic pressure generating section 32 which generates brake hydraulic pressure corresponding to the operating force of a brake pedal BP; an RR brake hydraulic pressure adjusting section 33, an FL brake hydraulic pressure adjusting section 34, an FR brake hydraulic pressure adjusting section 35, and an RL brake hydraulic pressure adjusting section 36, which can adjust the brake hydraulic pressures supplied to corresponding wheel cylinders Wrr, Wfl, Wfr, and Wrl respectively installed on the wheels RR, FL, FR, and RL; and a return brake fluid supply section 37.

The brake hydraulic pressure generating section 32 includes a vacuum booster VB which operates in response to operation of the brake pedal BP, and a master cylinder MC which is linked to the vacuum booster VB. The vacuum booster VB utilizes the pressure (negative pressure) of air within an intake pipe of the engine 21 so as to boost the operating force of the brake pedal BP by a prescribed ratio and transmits the boosted operating force to the master cylinder MC.

The master cylinder MC has two output ports; i.e., a first port and a second port. The master cylinder MC receives brake fluid from a reservoir RS, and generates from the first port a first master cylinder hydraulic pressure Pm corresponding to the boosted operating force. The master cylinder MC also generates from the second port a second master cylinder hydraulic pressure Pm which is substantially the same as the first master cylinder hydraulic pressure and which corresponds to the boosted operating force.

The structures and operations of the master cylinder MC and the vacuum booster VB are well known, and therefore an explanation of the details thereof will be omitted. In this manner, the master cylinder MC and the vacuum booster VB (brake hydraulic pressure generation means) generate first and second master cylinder hydraulic pressures corresponding to the operating force of the brake pedal BP.

A normally-open linear solenoid valve PC1 is interposed between the first port of the master cylinder MC and the upstream side of the RR brake hydraulic pressure adjusting section 33 and the upstream side of the FL brake hydraulic pressure adjusting section 34. Similarly, a normally-open linear solenoid valve PC2 is interposed between the second port of the master cylinder MC and the upstream side of the FR brake hydraulic pressure adjusting section 35 and the upstream side of the RL brake hydraulic pressure adjusting section 36. The details of the normally-open linear solenoid valves PC1 and PC2 will be described later.

The RR brake hydraulic pressure adjusting section 33 consists of a pressure-increasing valve PUrr, which is a normally-open solenoid valve of a 2-port, 2-position type, and a pressure-reducing valve PDrr, which is a normally-closed solenoid valve of a 2-port, 2-position type. The pressure-increasing valve PUrr establishes and breaks communication between the upstream side of the RR brake hydraulic pressure adjusting section 33 and the wheel cylinder Wrr, which will be described later. The pressure-reducing valve PDrr establishes and breaks communication between the wheel cylinder Wrr and a reservoir RS1. Therefore, through control of the pressure-increasing valve PUrr and the pressure-reducing valve PDrr, the brake hydraulic pressure within the wheel cylinder Wrr (wheel cylinder pressure PWrr) can be increased, maintained, and reduced.

In addition, a check valve CV1 which allows flow of the brake fluid in only one direction from the wheel cylinder Wrr side to the upstream side of the RR brake hydraulic pressure adjusting section 33 is connected in parallel with the pressure-increasing valve PUrr. As a result, when the brake pedal BP is released after being operated, the wheel cylinder pressure PWrr is rapidly decreased.

Similarly, the FL brake hydraulic pressure adjusting section 34, the FR brake hydraulic pressure adjusting section 35, and the RL brake hydraulic pressure adjusting section 36 comprise a pressure-increasing valve PUfl and a pressure-reducing valve PDfl, a pressure-increasing valve PUfr and a pressure-reducing valve PDfr, and a pressure-increasing valve PUrl and a pressure-reducing valve PDrl, respectively. Through control of each pressure-increasing valve and pressure-reducing valve, the brake hydraulic pressure in the wheel cylinder Wfl, the wheel cylinder Wfr, and the wheel cylinder Wrl (wheel cylinder pressures PWfl, PWfr, PWrl) can be increased, maintained, or decreased. Checks valves CV2, CV3, and CV4 are provided in parallel with the pressure-increasing valves PUfl, PUfr, and PUrl, respectively, to provide the same function as that of the check valve CV1.

The return brake fluid supply section 37 includes a DC motor MT, and two hydraulic pumps (gear pumps) HP1 and HP2 simultaneously driven by the motor MT. The hydraulic pump HP1 pumps the brake fluid returned from the pressure reducing values PDrr and PDfl to the reservoir RS1, and supplies the pumped brake fluid to the upstream sides of the RR brake hydraulic pressure adjusting section 33 and the FL brake hydraulic pressure adjusting section 34 via a check valve CV8.

Similarly, the hydraulic pump HP2 pumps the brake fluid returned from the pressure reducing values PDfr and PDrl to the reservoir RS2, and supplies the pumped brake fluid to the upstream sides of the FR brake hydraulic pressure adjusting section 35 and the RL brake hydraulic pressure adjusting section 36 via a check valve CV11. Notably, in order to reduce pulsations of discharge pressures of the hydraulic pumps HP1 and HP2, a damper DM1 is disposed in a hydraulic circuit between the check valve CV8 and the normally-open linear solenoid valve PC1, and a damper DM2 is disposed in a hydraulic circuit between the check valve CV11 and the normally-open linear solenoid valve PC2.

Next, the normally-open linear solenoid valve PC1 will be described. The valve body of the normally-open linear solenoid valve PC1 always receives force in the opening direction stemming from urging force of an unillustrated coil spring, and also receives force in the opening direction stemming from the differential pressure obtained through subtraction of the first master cylinder pressure Pm from the pressure at the upstream side of the RR brake hydraulic pressure adjusting section 33 and the FL brake hydraulic pressure adjusting section 34 (hereinafter may be simply referred to as "actual differential pressure") and force in the closing direction stemming from attraction force which increases in proportion to current supplied to the normally-open linear solenoid valve PC1 (i.e., operation current Id).

Figure 3:
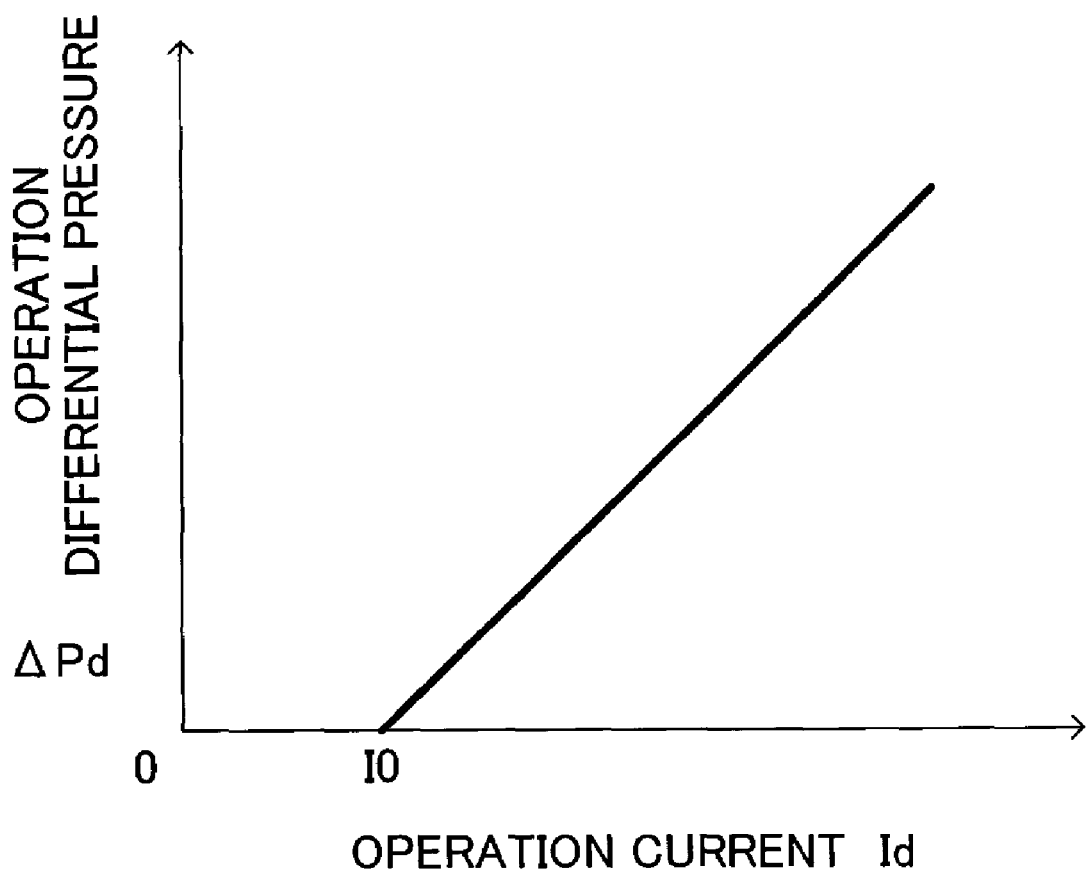
FIG. 3 is a graph showing the relation between a operation current and a operation differential pressure regarding the normally-open linear solenoid valve shown in FIG. 2.

As a result, as shown in FIG. 3, operation differential pressure ΔPd corresponding to the attraction force is determined such that it increases in proportion to the operation current Id. In FIG. 3, 10 represents a current value corresponding to the urging force of the coil spring. When the operation differential pressure ΔPd is greater than the above-described actual differential pressure, the normally-open linear solenoid valve PC1 closes so as to break the communication between the first port of the master cylinder MC, and the upstream portion of the RR brake hydraulic pressure adjusting section 33 and the upstream portion of the FL brake hydraulic pressure adjusting section 34.

Meanwhile, when the operation differential pressure ΔPd is less than the actual differential pressure, the normally-open linear solenoid valve PC1 opens so as to establish the communication between the first port of the master cylinder MC, and the upstream portion of the RR brake hydraulic pressure adjusting section 33 and the upstream portion of the FL brake hydraulic pressure adjusting section 34. As a result, the brake fluid at the upstream portion of the RR brake hydraulic pressure adjusting section 33 and the upstream portion of the FL brake hydraulic pressure adjusting section 34 (supplied from the hydraulic pump HP1) flows toward the first port of the master cylinder MC via the normally-open linear solenoid valve PC1, whereby the actual differential pressure is adjusted to coincide with the operation differential pressure ΔPd. Notably, the brake fluid flowing into the first port of the master cylinder MC is returned to the reservoir RS1.

In other words, when the motor MT (accordingly, the hydraulic pumps HP1 and HP2) is driven, the actual differential pressure (its allowable maximum value) can be controlled in accordance with the operation current Id of the normally-open linear solenoid valve PC1. At that time, the pressure on the upstream side of the RR brake hydraulic pressure adjusting section 33 and the FL brake hydraulic pressure adjusting section 34 becomes equal to the sum (Pm+ΔPd) of the first maser cylinder pressure Pm and the actual differential pressure (i.e., the operation differential pressure ΔPd).

Meanwhile, when the normally-open linear solenoid valve PC1 is brought into an unexcited state (i.e., when the operation current Id is set to zero), the normally-open linear solenoid valve PC1 maintains its open state because of urging force of the coil spring. At this time, the actual differential pressure becomes zero, and the pressure on the upstream side of the RR brake hydraulic pressure adjusting section 33 and the FL brake hydraulic pressure adjusting section 34 becomes equal to the first master cylinder pressure Pm.

The normally-open linear solenoid valve PC2 is the same as the normally-open linear solenoid valve PC1 in terms of structure and operation. Accordingly, when the motor MT (accordingly, the hydraulic pumps HP1 and HP2) is driven, the actual differential pressure is controlled in accordance with the operation current Id of the normally-open linear solenoid valve PC2, whereby the pressure on the upstream side of the FR brake hydraulic pressure adjusting section 35 and the RL brake hydraulic pressure adjusting section 36 becomes equal to the sum (Pm+ΔPd) of the second master cylinder pressure Pm and the operation differential pressure ΔPd. Meanwhile, when the normally-open linear solenoid valve PC2 is brought into an unexcited state, the pressure on the upstream side of the FR brake hydraulic pressure adjusting section 35 and the RL brake hydraulic pressure adjusting section 36 becomes equal to the second master cylinder pressure Pm.

In addition, a check valve CV5 which allows flow of the brake fluid in only one direction from the first port of the master cylinder MC to the upstream portion of the RR brake hydraulic pressure adjusting section 33 and the upstream portion of the FL brake hydraulic pressure adjusting section 34 is connected in parallel with the normally-open linear solenoid valve PC1. By virtue of this configuration, even during a period in which the actual differential pressure is controlled in accordance with the operation current Id supplied to the normally-open linear solenoid valve PC1, when, upon operation of the brake pedal BP, the first master cylinder pressure Pm becomes higher than the pressure on the upstream side of the RR brake hydraulic pressure adjusting section 33 and the upstream portion of the FL brake hydraulic pressure adjusting section 34, brake hydraulic pressure (i.e., the first master cylinder pressure Pm) corresponding to the operation force of the brake pedal BP is supplied to the wheel cylinders Wrr and Wfl. Further, a check valve CV6, which provides the same function as does the check valve CV5, is connected in parallel with the normally-open linear solenoid valve PC2.

As is apparent from the above description, the brake hydraulic pressure control apparatus 30 is composed of two hydraulic circuit systems; i.e., a hydraulic circuit system regarding the rear right wheel RR and the front left wheel FL and a hydraulic circuit system regarding the rear left wheel RL and the front right wheel FR. The hydraulic pressure control apparatus 30 is configured such that when all the solenoid valves are in their unexcited states, brake hydraulic pressure (i.e., master cylinder pressure Pm) corresponding to the operation force of the brake pedal BP is supplied to the wheel cylinder W**.

Notably, the symbol "" appended to various variables and the like collectively represents the symbols fl, fr, rl, and rr and indicates that the particular variable or the like applies to all of the wheels FR, FL, etc. of the vehicle. For example, the wheel cylinder W collectively indicates the wheel cylinder Wfl for the front left wheel, the wheel cylinder Wfr for the front right wheel, the wheel cylinder Wrl for the rear left wheel, and the wheel cylinder Wrr for the rear right wheel.

Meanwhile, the hydraulic pressure control apparatus 30 is configured such that when the motor MT (accordingly, the hydraulic pumps HP1 and HP2) is driven and the normally-open linear solenoid valves PC1 and PC2 are excited by an operation current Id in this state, brake hydraulic pressure which is higher than the master cylinder pressure Pm by an operation differential pressure ΔPd determined in accordance with the operation current Id can be supplied to the wheel cylinder W**.

In addition, the hydraulic pressure control apparatus 30 is configured such that the wheel cylinder pressure PW can be individually adjusted through control of the pressure-increasing valve PU and the pressure-reducing valve PD**. That is, the hydraulic pressure control apparatus 30 is configured to individually adjust the brake forces applied to the respective wheels independently of operation of the brake pedal BP by the driver.

Thus, the hydraulic pressure control apparatus 30 can achieve vehicle stabilization control (over-steer suppression control) in accordance with an instruction from an electronic control apparatus 50. The vehicle stabilization control is adapted to maintain the stability of the vehicle as will be described later.

Referring back to FIG. 1, the sensor section 40 includes electromagnetic-pickup-type wheel speed sensor 41*fl*, 41*fr*, 41*rl*, and 41*rr* which respectively output signals having frequencies corresponding to the respective rotational speeds of the wheels FL, FR, RL, and RR; an accelerator opening sensor 42 which detects an operated amount of an accelerator pedal AP operated by a driver and outputs a signal indicative of the operation mount Accp of the accelerator pedal AP; a master cylinder pressure sensor 43 (see FIG. 2) for detecting the (first) master cylinder pressure and outputs a signal indicative of the master cylinder pressure Pm; a lateral acceleration sensor 44 which detects a lateral acceleration of the vehicle and outputs a signal indicative of the lateral acceleration (actual lateral acceleration Gy); a yew rate sensor 45 which detects a yaw rate of the vehicle and outputs a signal indicative of the yaw rate (actual yaw rate Yr); and a steering angle sensor 46 which detects a rotational angle of a steering wheel ST from its neutral position and outputs a signal indicative of the steering angle θs.

The steering angle θs is zero when the steering wheel ST is located at the neutral position. The steering angle θs assumes a positive value when the steering wheel ST is turned counterclockwise (as viewed from a driver side), and assumes a negative value when the steering wheel ST is turned clockwise. Each of the actual lateral acceleration Gy and the actual yaw rate Yr assumes a positive value when the vehicle turns to the left (counterclockwise as viewed from the upper side of the vehicle), and assumes a negative value when the vehicle turns to the right.

The electronic controller 50 is a microcomputer which includes a CPU 51; ROM 52 in which are previously stored routines (programs) to be executed by the CPU 51, tables (look-up tables and maps), constants, and the like; RAM 53 in which the CPU 51 temporarily stores data as necessary; backup RAM 54 which stores data when the power supply is on and which maintains the stored data when the power supply is cut off; an interface 55 containing A/D converters; and the like. The above components are interconnected via a bus. The interface 55 is connected to the sensors 41 to 46. The interface 55 supplies signals from the sensors 41 to 46 to the CPU 51. Further, in accordance with instructions from the CPU 51, the interface 55 outputs drive signals to the respective solenoid valves and the motor MT of the hydraulic pressure control apparatus 30, the throttle valve actuator 22, and the fuel injection apparatus 23.

By virtue of the above-described configuration, the throttle valve actuator 22 drives the throttle valve TH such that the opening TA of the throttle valve TH basically coincides with an opening corresponding to the operation amount Accp of the accelerator pedal AP; and the fuel injection apparatus 23 injects fuel of a quantity which is required to obtain a predetermined target air-fuel ratio (theoretical air-fuel ratio) for the intake air quantity corresponding to the opening TA of the throttle valve TH.

Further, the operation currents Id (supply current) of the normally-open linear solenoid valves PC1 and PC2 are controlled by the CPU 51. Specifically, the CPU 51 adjusts the duty ratio of the supply current to thereby adjust the average (effective) current as the operation current Id.

Outline of Vehicle Stabilization Control

Next, explanations will be given regarding the outline of vehicle stabilization control (over-steering suppression control) performed by the motion control apparatus 10 (hereafter, "the present apparatus") of the embodiment of the present invention having the above described configuration.

The present apparatus calculates the steering angle yaw rate Yrt based on the following Formula (1), which is based on the theoretical formula led from a motion model of the vehicle. This steering angle yaw rate Yrt is set so that when the vehicle is turning in the left direction (i.e., when the steering angle θs is a positive value) it becomes a positive value, and when the vehicle is turning in the right direction (i.e., when the steering angle θs is a negative value) it becomes a negative value. This theoretical formula is for calculating the theoretical value of the yaw rate when the vehicle is turning in a state where the steering angle and the vehicle body speed are both constant.

$$Yrt=(Vso \cdot \theta s)/(n \cdot L) \cdot (1/(1+Kh \cdot Vso^2)) \quad (1)$$

In the above Formula (1) Vso is the estimated vehicle body speed that is calculated as will be described later. Further, L is the wheel base of the vehicle, Kh is the stability factor, and n is the steering gear ratio. The wheel base 1, stability factor Kh, and steering gear ratio n are constants determined in accordance with the specifications of the vehicle.

Further, the present apparatus calculates the yaw rate deviation ΔYr, which is the value obtained by subtracting the absolute value of the steering angle yaw rate Yrt from the absolute value of the actual yaw rate Yr that can be obtained by use of the yaw rate sensor 45, based on the following Formula (2).

$$\Delta Yr = |Yr| - |Yrt| \quad (2)$$

Further, the present apparatus sets the control threshold value TH based on the following Formula (3).

$$TH = (THbase + THadd) \cdot Kth \quad (3)$$

In the above Formula (3), Thbase is the base threshold value, and is a positive value determined in accordance with the estimated vehicle body speed Vso, as will be described later. THadd is the threshold value correction amount, and is a value equal to or greater than "0" determined in accordance with the absolute value of the actual lateral acceleration Gy that can be obtained by use of the lateral acceleration sensor 44, as will be described later.

Kth is the threshold value coefficient that is set at "1", except in a case where it has been determined that the vehicle is in spin tendency (hereafter, may be referred to as "time of spin tendency") as will be described later. As will be explained in detail later, at the time of spin tendency, the threshold value coefficient Kth is set to be "0.5" or more and no greater than "1". Accordingly, at the time of spin tendency, when compared to a case where it has not been determined that the vehicle is in spin tendency (hereafter, may be referred to as "normal time") the control threshold value TH is set to be smaller.

The fact that the value of the yaw rate deviation ΔYr calculated with the above Formula (2) is a positive value means that the vehicle is in a state where the turning radius is smaller than a case where it has been assumed that steering angle yaw rate Yrt is generated in the vehicle. The present apparatus determines that the vehicle is in a "state of over-steering" when the yaw rate deviation ΔYr is greater than the control threshold value TH (>0) set in accordance with the above Formula (3).

The present apparatus executes vehicle stabilization control (i.e., over-steering suppression control) in order to suppress the state of over-steering when it has determined that the vehicle is in a "state of over-steering". Specifically, the present apparatus generates predetermined braking force at the front wheel on the outer side of the turning locus so as to forcedly generate a yawing moment in the direction opposite the yawing direction. Due to this, the absolute value of the actual yaw rate Yr becomes-less, and the actual yaw rate Yr is controlled so as to approach the steering angle yaw rate Yrt. As a result, the stability of the vehicle can be maintained.

As described above, when the yaw rate deviation ΔYr exceeds the control threshold value TH, vehicle stabilization control is initiated. Further, the smaller the control threshold value TH is, the easier it becomes for the yaw rate deviation ΔYr to exceed the control threshold value TH. Accordingly, the smaller the control threshold value TH is, the earlier vehicle stabilization control is initiated and executed.

Notably, the fact that the value of the yaw rate deviation ΔYr calculated with the above-described Formula (2) is a negative value means that the vehicle is in a state in which the turning radius becomes larger than that in an assumed case where the steering angle yaw rate Yrt is generated in the vehicle. In the present example, when the value of the yaw rate deviation ΔYr is smaller than a predetermined negative value "−Yrus" (i.e., Yrus is a positive constant), it is determined that the vehicle is in a "state of under-steering". This is the outline of the vehicle stabilization control.

Outline of Spin Tendency Detection

Next, explanations will be made regarding the outline of spin tendency detection performed by the present apparatus while referring to FIG. 4. The present apparatus determines that the vehicle is undergoing spin tendency when the apparatus detects that the driver has performed an operation that inducts spin tendency of the vehicle (hereafter referred to as "specific operation"), and then detects that a behavior that indicates spin tendency (hereafter referred to as "specific behavior") has occurred in the vehicle. Hereafter, detection of the specific operation by the driver and detection of the specific behavior will be explained in order.

<Detection of a Specific Operation by the Driver>

Figure 4:
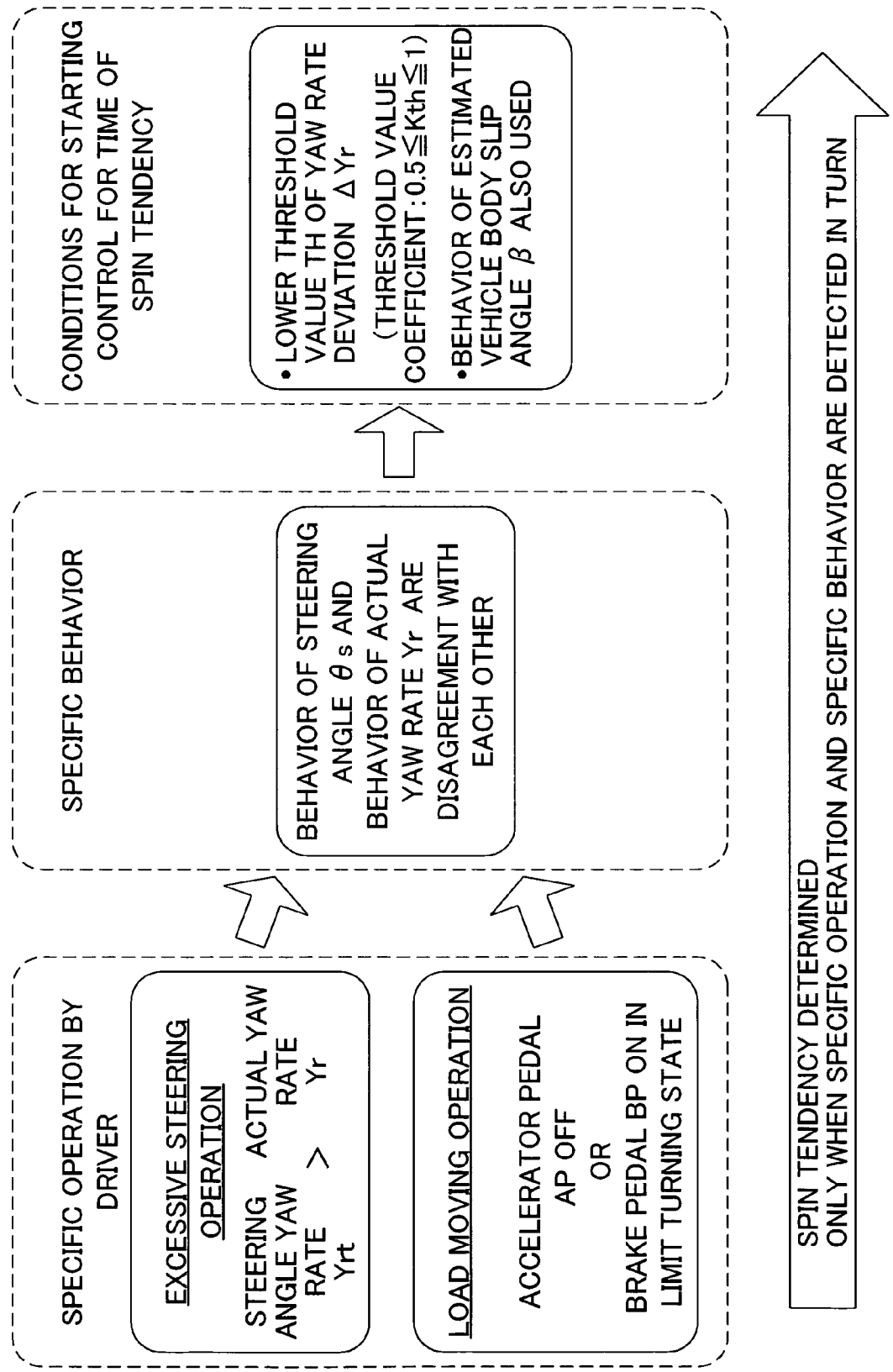
FIG. 4 is a diagram for making it easier to understand the method of detection of spin tendency by the motion control apparatus showed in FIG. 1 and starting conditions of vehicle stabilization control at the time of spin tendency.

With the present apparatus, it is assumed that there are two types of operations for the specific operations by the driver, as shown in FIG. 4. The first is an excessive steering operation in the turning direction. As described above, when the excessive steering operation is performed in a case where the vehicle is traveling on a road surface with an especially low μ, a relatively slow spin tendency occurs thereafter in the vehicle.

The present apparatus determines that an excessive steering operation has been performed by the driver when the under-steering state of the vehicle continues for a predetermined time Tusref (i.e., it detects the fact that an excessive steering operation has been performed).

The second operation is a load moving operation that increases the load applied to the wheels of the front side of the vehicle body. As previously described, in cases where the vehicle is in the aforementioned limit turning state, when the above load moving operation is performed, a relatively slow spin tendency occurs thereafter in the vehicle.

The present apparatus determines whether the vehicle is in a limit turning state as will be described later. Then in the period during which it is detecting the limit turning state of the vehicle, it determines that the above-described load moving operation has been performed by the driver when the accelerator pedal AP has been released or the brake pedal BP pressed continuously for a predetermined time Ttcinref (i.e., it detects the fact that the load moving operation has been performed).

<Detection of Specific Behavior>

When spin tendency occurs in the vehicle due to a specific operation by the driver, the actual yaw rate Yr (the absolute value thereof) increases gradually. At this time, as described above, it is often the case that the driver steers in the direction for suppressing the increase of the absolute value of the actual yaw rate Yr (i.e., in the direction reducing the absolute value of the steering angle θs) or that the driver steers so as to maintain the position of the steering wheel ST (i.e., so the steering angle θs is maintained to be substantially constant).

As a result, the behavior of the steering angle θs and the behavior of the actual yaw rate Yr are in disagreement with each other. In other words, the disagreement between the behavior of the steering angle θs and the behavior of the actual yaw rate Yr can become the specific behavior indicating the above-described spin tendency.

Meanwhile, when steering is performed in the direction that reduces the absolute value of the steering angle θs, as the turning angle of the front wheels FR, FL, which are the steerable wheels, becomes smaller, increases in the absolute value of the actual yaw rate Yr are suppressed. As a result, the actual yaw rate Yr is maintained to be substantially constant. Further, when the steering angle θs is maintained to be substantially constant, the turning angle of the front wheels FR, FL is maintained to be substantially constant, whereby the absolute value of the actual yaw rate Yr increases.

In view of the above, the present apparatus determines that a specific behavior has occurred in the vehicle (i.e., detects the fact that a specific behavior has occurred in the vehicle) when a state where the absolute value of the steering angle θs becomes smaller and the actual yaw rate Yr is maintained to be substantially constant, or a state where the steering angle θs is maintained so as to be substantially constant and the absolute value of the actual yaw rate Yr is increasing (hereafter, these states are referred to as "state of disagreement") continues for the predetermined time Tyrref.

Then, the present apparatus determines that the vehicle is in spin tendency (i.e., detects spin tendency) when a specific operation by the driver and the specific behavior are continuously detected. Due to this, even if a relatively slow spin tendency is caused by a specific operation of the driver, this spin tendency can be detected with certainty. The above is the outline of the detection of spin tendency.

<Operation of Coping with the Time of Spin Tendency>

When spin tendency occurs in the vehicle (i.e., at the time of spin tendency), the yaw rate deviation ΔYr increases because of the above-described "disagreement between the behavior of the steering angle θs and the behavior of the actual yaw rate Yr". Meanwhile, when spin tendency has occurred in the vehicle, it is preferable to early initiate and execute the above vehicle stabilization control in order to maintain the stability of the vehicle. In view of this, during the time of spin tendency, the present apparatus changes the control initiating conditions of the vehicle stabilization control so that the vehicle stabilization control is easily initiated as compared to the case of normal times.

<Lowering of the Value of the Threshold Value Coefficient Kth>

More specifically, the present apparatus sets the value of the threshold value coefficient Kth of the above Formula (3), which is usually maintained at "1", to between "0.5" and "1". In this case, the threshold value coefficient Kth consecutively is changed in accordance with the continuation time of the above-describe disagreement state (accordingly, a specific behavior) from after the point of time it was detected that the above specific behavior occurred, as will be described hereafter.

Due to this, since the control threshold value TH is set to be smaller at the time of spin tendency than at normal times, it becomes easier for the yaw rate deviation ΔYr to exceed the control threshold value TH. Accordingly, vehicle stabilization control can be initiated and executed quicker than during normal times.

<Additional Use of Vehicle Body Slip Angle β>

When the driver steers such that the steering angle yaw rate Yrt approaches the actual yaw rate Yr at the time of spin tendency, the yaw rate deviation ΔYr is usually calculated as a value approaching "0". In such a case, a situation can occur where the yaw rate deviation ΔYr does not exceed the control threshold value TH, even if the control threshold value TH is made to be small as described above. Even in such a case, it is preferable that vehicle stabilization control can be initiated and executed in order to maintain the stability of the vehicle.

Meanwhile, the vehicle body slip angle β, which is the angle made by the fore-aft direction of the vehicle body and the heading direction of the vehicle body, increases gradually when spin tendency has occurred in the vehicle. Accordingly, even if the yaw rate deviation ΔYr is not greater than the above lowered control threshold value TH, it is preferable to initiate and execute vehicle stabilization control when the vehicle body slip angle β increases.

In view of the above, the present apparatus consecutively calculates the estimated vehicle body slip angle β based on the Formula (4) below. At the time of spin tendency, the present apparatus obtains the estimated vehicle body slip angle β (hereafter, "reference vehicle body slip angle βref") at the point in time where the yaw rate deviation ΔYr exceeded half the value of the above lowered control threshold value TH. Then, after this, the present apparatus initiates and executes vehicle stabilization control when the absolute value of the estimated vehicle body slip angle β becomes greater by a predetermined amount than the absolute value of the reference vehicle body slip angle βref, even when the yaw rate deviation ΔYr is not greater than the above lowered control threshold value TH. Due to this as well, vehicle stabilization control can be early initiated and executed.

$$\beta = \int (Yr - (Gy/Vso)) dt \quad (4)$$

It should be noted that the above Formula (4) shows that the estimated vehicle body slip angle β is value that can be obtained through time integration of the difference (=vehicle body slip angle speed Dβ) between the actual yaw rate Yr and the yaw rate of the vehicle (hereafter, "lateral acceleration yaw rate") calculated from the actual lateral acceleration Gy of the vehicle and the estimated vehicle body speed Vso. Further, the estimated vehicle body slip angle β calculated according to the above Formula (4) is calculated so as to be a positive value in a case where the fore-aft direction of the vehicle body, when viewed from above, is inclined counterclockwise direction from the heading direction of the vehicle. The above is the outline of the operation of coping with the time of spin tendency.

Actual Operation

Next, the actual operation of the motion control apparatus 10 of the embodiment of the present invention configured as described above will be explained while referring to FIGS. 5 through 12 showing the routine executed by the CPU 51 of the electrical control apparatus 50 with the flowcharts. Hereafter, for the sake of convenience of explanation, the operation in a state where spin tendency of the vehicle is not detected, i.e., at "normal times", will be explained.

Figure 5:
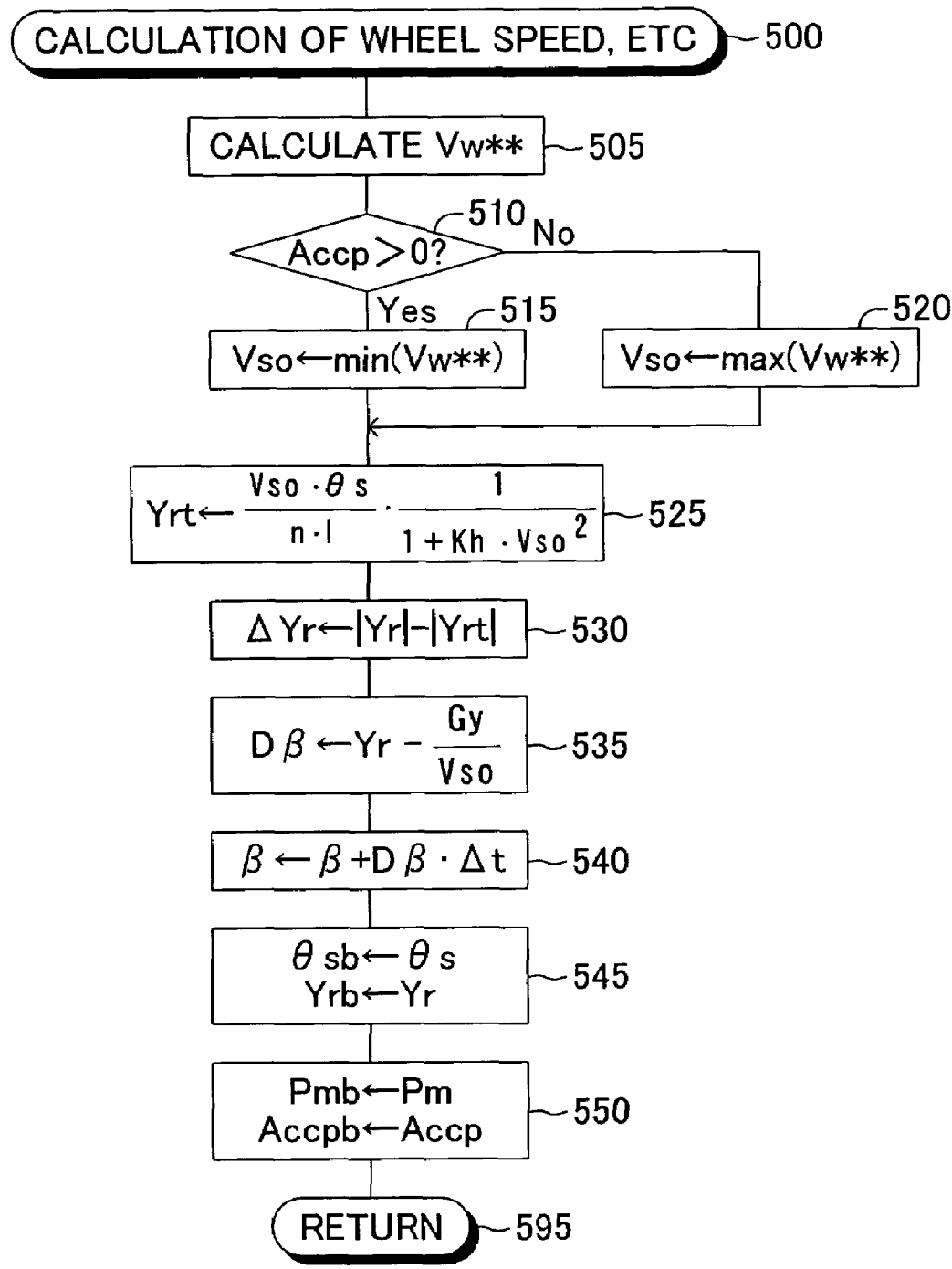

The CPU 51 repeatedly executes the routine shown in FIG. 5 for performing calculation of the wheel speed and the like as the passage of each predetermined time (execution interval time Δt, e.g., 6 msec.). Accordingly, when it becomes a predetermined timing, the CPU 51 initiates processing from step 500 and proceeds to step 505, and respectively calculates the wheel speed of the wheel (the speed of the outer periphery of the wheel). Specifically, the CPU 51 respectively calculates the wheel speed Vw based on the fluctuation frequency of the output value of the wheel speed sensor 41.

Next, the CPU 51 proceeds to step 510 and determines whether the accelerator pedal operation amount Accp obtained from the accelerator opening sensor 42 is greater than "0" (that is, whether the vehicle is in a state of acceleration or a state of deceleration), and when it is determined as "Yes", proceeds to step 515 and calculates the smallest value from the wheel speed Vw as the estimated vehicle body speed Vso. On the other hand, if the CPU 51 determines it is "No", it proceeds to step 520 and calculates the largest value from the wheel speed Vw as the estimated vehicle body speed Vso.

Next, the CPU 51 proceeds to step 525 and calculates the yaw rate Yrt based on the estimated vehicle body speed Vso calculated in the above-mentioned step 515 or 520, and the steering angle θs obtained from the steering angle sensor 46, in accordance with the above Formula (1).

Next, the CPU 51 proceeds to step 530 and calculates the yaw rate deviation ΔYr based on the actual yaw rate Yr obtained from the yaw rate sensor 45, the steering angle yaw rate Yrt calculated at the above step 525, and the above Formula (2). This step 530 corresponds to the over-steering degree obtaining means.

Next, the CPU 51 proceeds to step 535 and obtains the vehicle body slip angle speed Dβ based on the actual lateral acceleration Gy obtained from the lateral acceleration sensor 44, the above calculated estimated vehicle body speed Vso, the above obtained actual yaw rate Yr, and the formula recited in step 535. At step 540 subsequent thereto, the CPU 51 obtains a new estimated vehicle body slip angle β (updates the estimated vehicle body slip angle β) by adding, to the estimated vehicle body slip angle β at that time, the product of the obtained vehicle body slip angle speed Dβ and the above-described execution interval Δt. This computing at step 540 corresponds to the integral computing of the above Formula (4). That is, step 540 corresponds to the vehicle body slip angle obtaining means.

Next, the CPU 51 proceeds to step 545 and respectively stores the above obtained steering angle θs and the above obtained actual yaw rate Yr as the previous steering angle θsb and the previous actual yaw rate Yrb. Similarly, the CPU 51 respectively stores the master cylinder pressure Pm obtained from the master cylinder pressure sensor 43 and the above obtained accelerator pedal operation amount Accp as the previous master cylinder pressure Pmb and the previous accelerator pedal operation amount Accpb at the next step 550. Each of these respective previous values is used in a routine that will be described later.

Then the CPU 51 proceeds to step 595 and completes the present routine once. After that, the CPU 51 consecutively updates each value by continuously executing the present routine at each progress of the execution time interval Δt.

Figure 6:
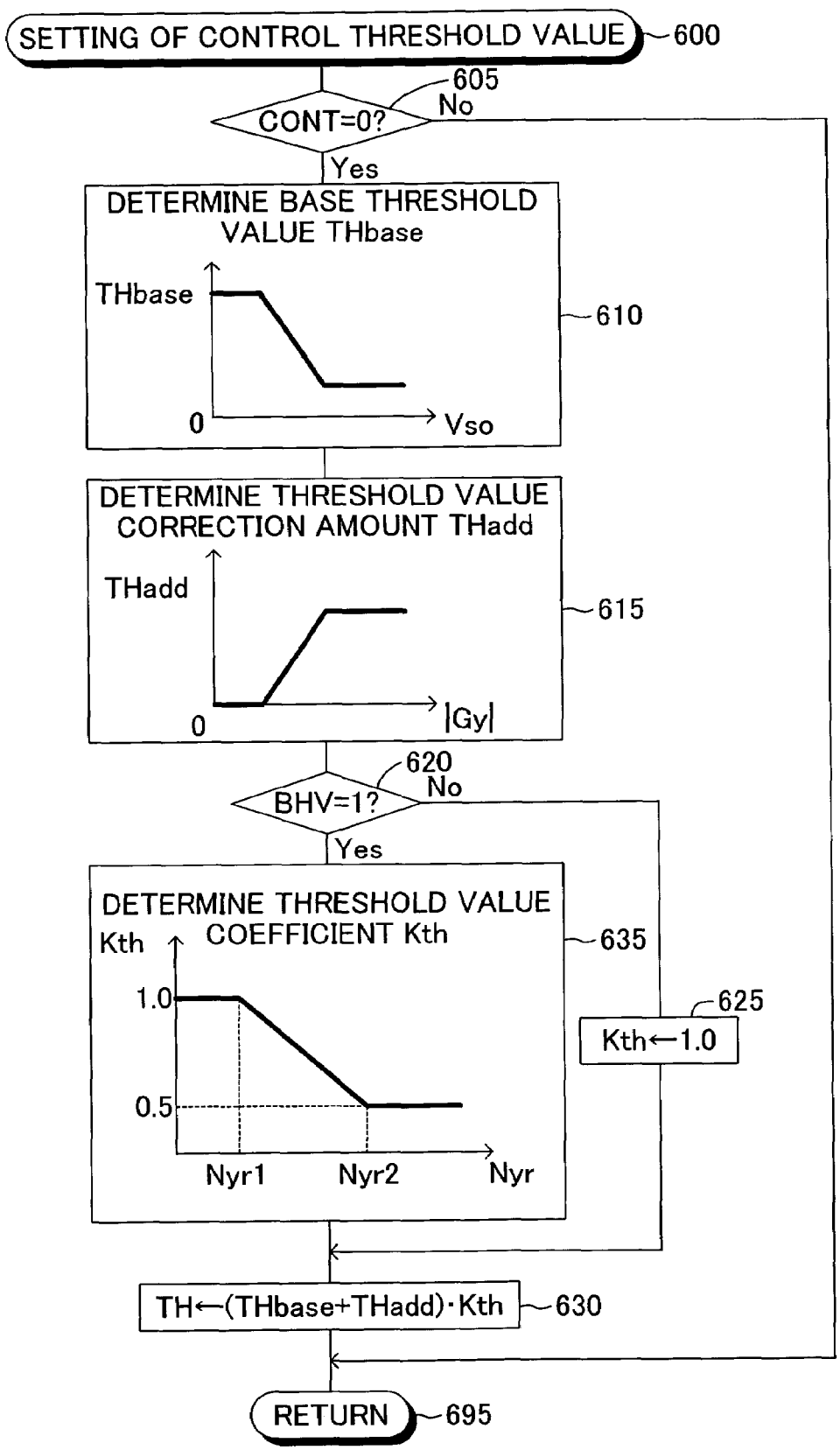
FIG. 6 is a flowchart showing a routine executed by the CPU shown in FIG. 1 for setting the control threshold value.

Further, the CPU 51 continuously executes the routine in FIG. 6 for setting the control threshold value TH at the passage of each predetermined time (e.g., 6 msec). Accordingly, when it becomes a predetermined timing, the CPU 51 initiates processing from step 600, proceeds to step 605 and determines whether the value of the control flag CONT is "0", and when it determines that it is "No", immediately proceeds to step 695 and completes the present routine once.

Here, when the value of the control flag CONT is "1", this indicates that vehicle stabilization control is in the process of being executed, and when the value is "0", this indicates that vehicle stabilization control is not in the process of being executed.

Now, when vehicle stabilization control is assumed not to be in the process of being executed, the CPU 51 determines "Yes" at step 605 and proceeds to step 610 and determines the base threshold value THbase based on the table recited in step 610 and the estimated vehicle body speed Vso calculated in the previous step 515 or step 520. Due to this, the base threshold value THbase is set such that the greater the estimated vehicle body speed Vso is, the smaller the base threshold value THbase (positive value) becomes.

Next, the CPU 51 proceeds to step 615 and determines the threshold value correction amount THadd based on the table recited in step 615 and the absolute value of the above obtained actual lateral acceleration Gy. Due to this, the base threshold value THbase is set such that the larger the absolute value of the actual lateral acceleration Gy becomes, the larger the base threshold value THbase become. It should be noted that as a result of this, the base threshold value THbase can be thought of as being set such that the larger the road surface friction coefficient μ is, the larger the base threshold value THbase becomes.

Subsequently, the CPU 51 proceeds to step 620 and determines whether the value of the spin tendency detection flag BHV has become "1". Here, when the value of the spin tendency detection flag BHV is "1", this indicates that spin tendency is detected (accordingly, "spin tendency time") whereas when the value is "0", this indicates that spin tendency is not detected (accordingly, "normal time").

At the present point in time, it is "normal time" due to the above-described assumption, so the CPU 51 determines "No" at step 620 and proceeds to step 625 and sets the value of the threshold value coefficient Kth at "1". At step 630 subsequent thereto, the CPU 51 sets the control threshold value TH based on the above base threshold value THbase, the above threshold value correction amount THadd, the above threshold value coefficient Kth, and the above Formula (3).

Due to this, the value of the control threshold value TH is set to be larger the smaller estimated vehicle body speed Vso is and the larger the absolute value of the actual lateral acceleration Gy is. Thereafter, the CPU 51 repeatedly executes the above-described processing at the passage of each interval of time as long as vehicle stabilization control is not initiated (i.e., CONT=0) and it is "normal time". Due to this, the CPU 51 consecutively updates the control threshold value TH in accordance with the estimated vehicle body speed Vso and the absolute value of the actual lateral acceleration Gy with the value of the threshold value coefficient Kth maintained at "1".

Figure 7:
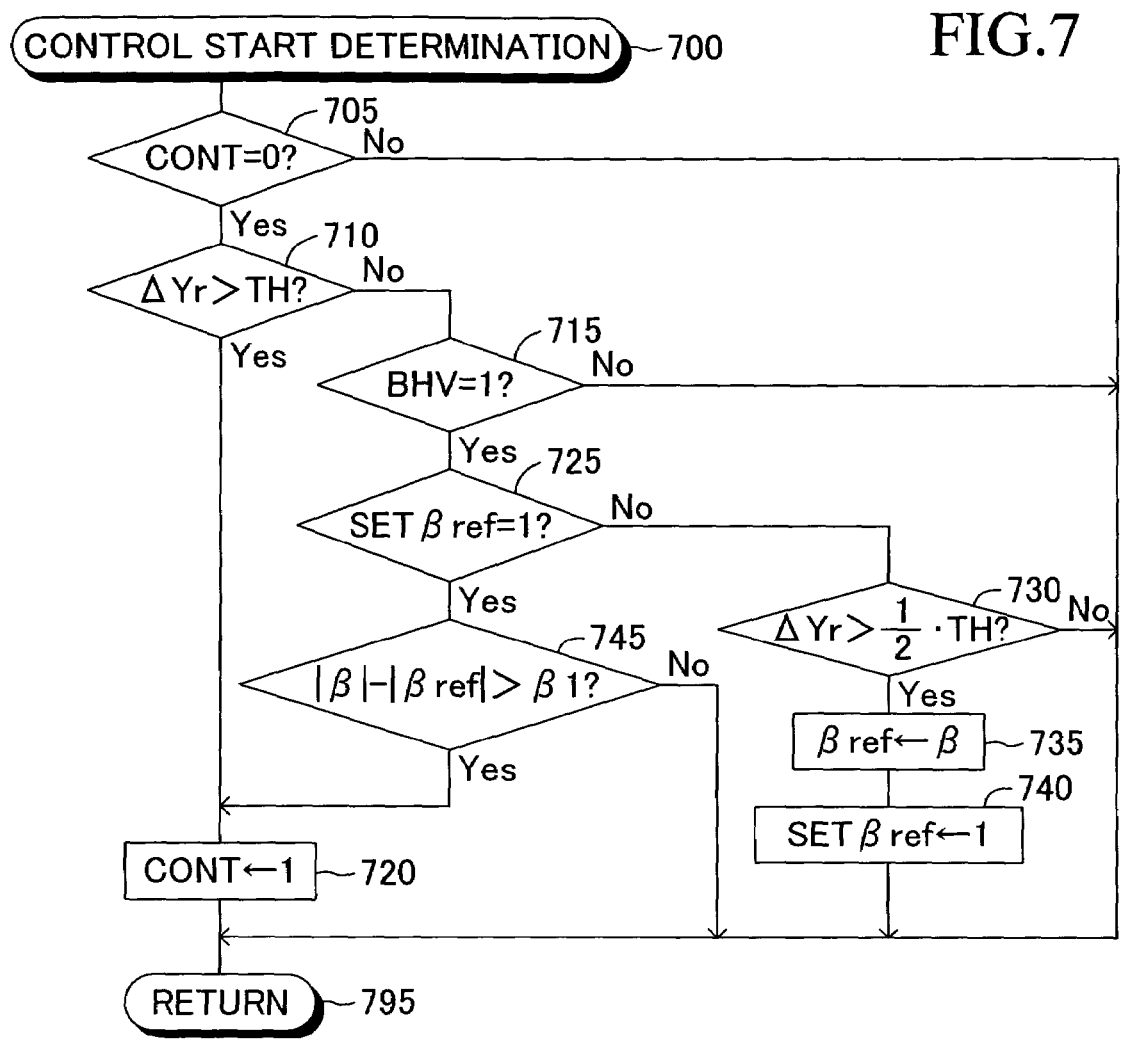
FIG. 7 is a flowchart showing a routine executed by the CPU shown in FIG. 1 for performing control initiation determination.

Further, the CPU 51 repeatedly executes the routine for performing the control initiation determination shown in FIG. 7 at each passage of predetermined time (e.g., 6 msec). Accordingly, the CPU 51 initiates processing from step 700 at predetermined timing, proceeds to step 705, and determines whether the value of the control flag CONT has become "0". When it has determined that the answer is "No", the CPU 51 immediately proceeds to step 795 and stops the present routine once.

At the present point in time, vehicle stabilization control is not in the process of being executed. Accordingly, the CPU 51 determines "Yes" at step 705, proceeds to step 710, and determines whether the value of the yaw rate deviation ΔYr obtained at the previously described step 530 is larger than the control threshold value TH set at the previously described step 630.

Now, if the value of the yaw rate deviation ΔYr has not exceeded the control threshold value TH, the CPU 51 determines "No" at step 710, proceeds to step 715, and determines whether the value of the spin tendency detection flag BHV is "1". At the present point in time, spin tendency has not been detected (accordingly, it is "normal time") so the CPU 51 also determines "No" at step 715 and immediately proceeds to step 795 and stops the present routine once. Thereafter, the CPU 51 repeatedly executes the above-described processing at the passage of each interval of predetermined time as long as the value of the yaw rate deviation ΔYr does not exceed the control threshold value TH and it is in "normal time".

Next, explanations will be given regarding cases where the value of the yaw rate deviation ΔYr exceeded the control threshold value TH (i.e., cases where it has been determined that the vehicle is in a state of over-steering or cases where the control initiation conditions have been fulfilled). In this case, the CPU 51 has determined "Yes" after proceeding to step 710 and thus proceeds to step 720, where it changes the control flag CONT from "0" to "1", and then proceeds to step 795 and completes the present routine once.

As a result, since the value of the control flag CONT is "1", the CPU 51 determines "No" when it proceeds to step 705, and immediately completes the present routine once. Further, the CPU 51 determines "No" when it proceeds to step 605 in FIG. 6, and immediately completes the present routine once. Due to this, the setting and update of the control threshold value TH is interrupted while the control initiation determination of vehicle stabilization control is interrupted.

Figure 8:
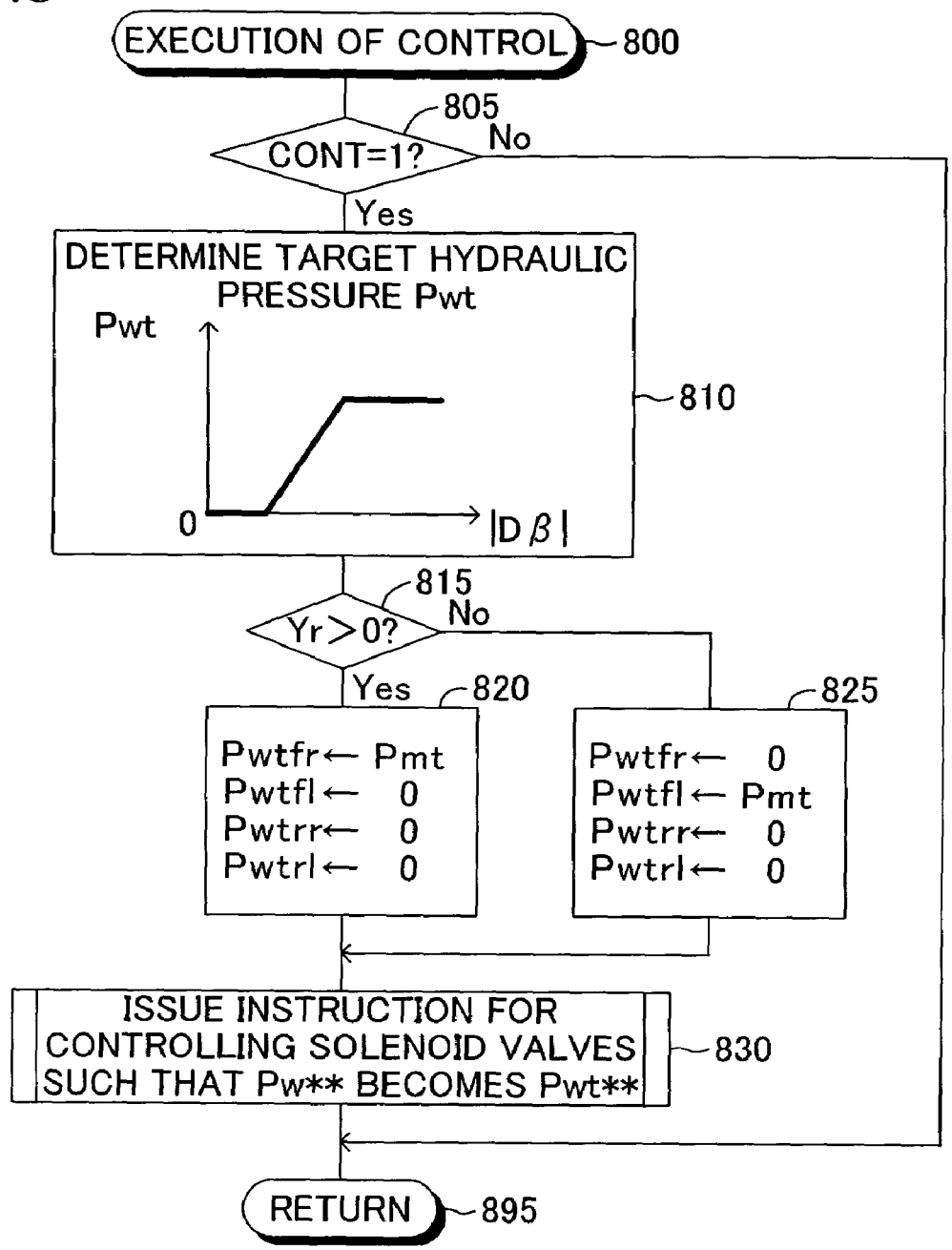
FIG. 8 is a flowchart showing a routine executed by the CPU shown in FIG. 1 for performing vehicle stabilization control.

Meanwhile, the CPU 51 repeatedly executes the control execution routine showed in FIG. 8 at every passage of set time (e.g., 6 msec). It should be noted that this routine corresponds to the stabilization control execution means. Accordingly, the CPU 51 initiates processing from step 800 at a predetermined timing, proceeds to step 805, and determines whether the value of control flag CONT is "1". When it determines "No", the CPU 51 immediately proceeds to step 895 and completes the present routine once.

Now, the present point in time is assumed to be immediately after the value of the control flag CONT has been changed from "0" to "1" due to the processing of the previously described step 720, the CPU 51 determines "Yes" at step 805 and proceeds to step 810. The CPU 51 determines the target hydraulic pressure Pwt based on the table recited within step 810 and on the absolute value of vehicle body slip angle speed Dβ obtained at the previous step 535. Due to this, the value of the target hydraulic pressure Pwt is set to be a value that is larger the larger the absolute value of the vehicle body slip angle speed Dβ becomes.

Subsequently, the CPU 51 proceeds to step 815 and determines whether the above obtained value of the actual yaw rate Yr is positive or not (accordingly, whether the vehicle is turning to the left or right). When it is determined to be "Yes", the CPU 51 proceeds to step 820 and sets the value of the target hydraulic pressure Pwt to the target hydraulic pressure Pwtfr of the front right wheel FR corresponding to the front wheel located on the outer side of the turning locus, while setting the target hydraulic pressures Pwtfl, Pwtrr, and Pwtrl to "0" for the remaining three wheels.

On the other hand, in a case where the vehicle is turning to the right, the CPU 51 determines "No" at step 815 and proceeds to step 825 and sets the above determined value of the target hydraulic pressure Pwt to the target hydraulic pressure Pwtfl of the front left wheel FL corresponding to the front wheel located on the outer side of the turning locus, while setting the target hydraulic pressures Pwtfr, Pwtrr, and Pwtrl to "0" for the remaining three wheels.

Then the CPU 51 proceeds to step 830 and issues a control command to the solenoid valve of the brake hydraulics control apparatus 30 so that the wheel cylinder pressure Pw of the wheels each becomes the above set target hydraulic pressure Pwt, and proceeds to step 895 and completes the present routine once. Thereafter, the CPU 51 continuously executes the above-described processing as long as the value of the control flag CONT is maintained at "1".

Due to this, vehicle stabilization control (i.e., over-steering suppression control) is initiated and executed, and vehicle stability can be maintained by reducing the absolute value of the actual yaw rate Yr. Further, as a result, the yaw rate deviation ΔYr reduces gradually.

It should be noted that in this case, the output of the engine 21 may be reduced as vehicle stabilization control in addition to the above-described application of braking force by means of brake hydraulic pressure. In this case, the CPU 51 may be configured so as to issue a drive instruction to the throttle valve actuator 22 so that the opening TA of the throttle valve TH becomes smaller by a predetermined amount than the opening corresponding to the operation amount Accp of the accelerator pedal AP. Alternatively, the CPU 51 may be configured so as to issue a drive instruction to the fuel injection device 23 to inject fuel in an amount that is smaller by a predetermined amount than the amount necessary to obtain the predetermined target air-fuel ratio (theoretical air-fuel ratio).

Figure 9:
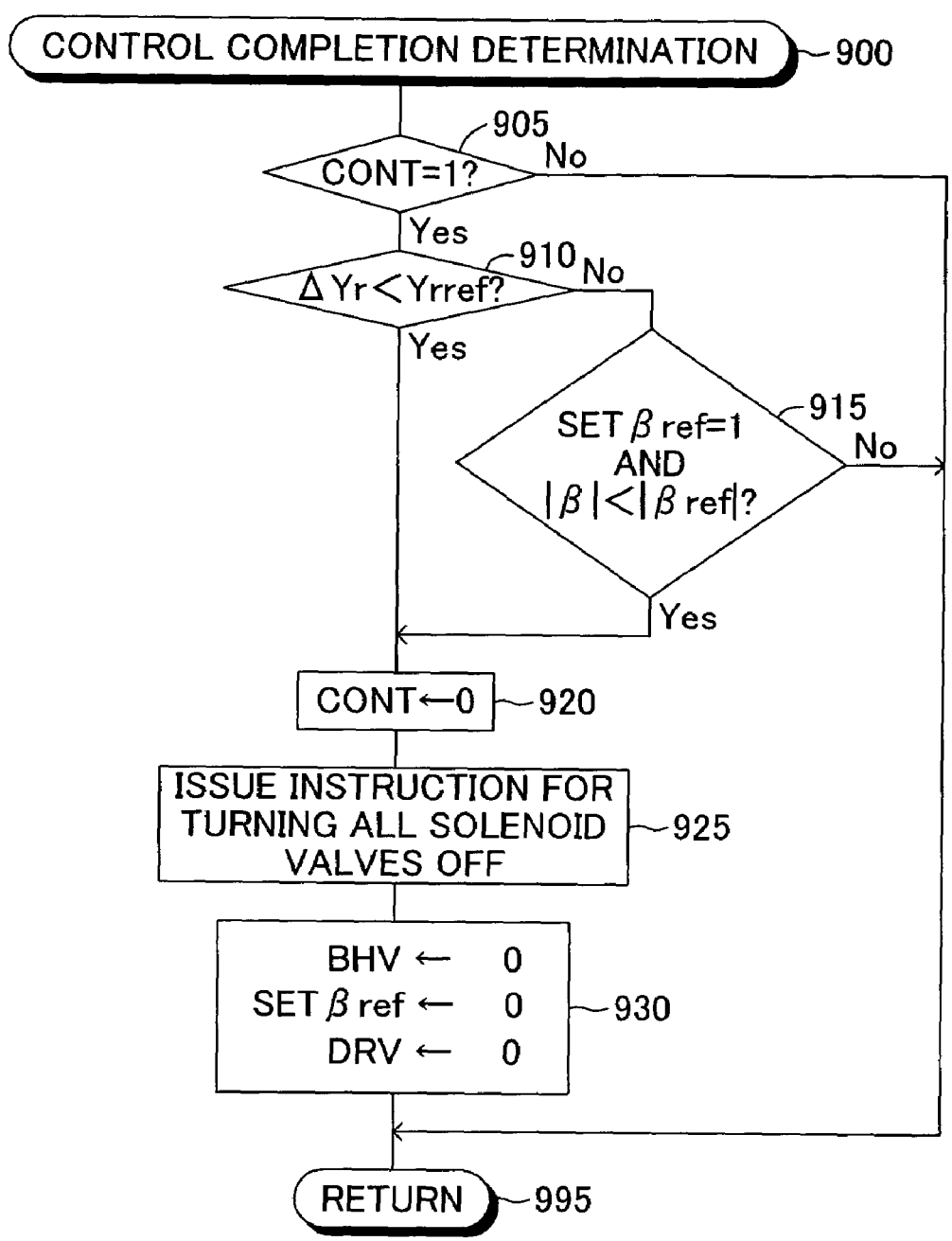
FIG. 9 is a flowchart showing a routine executed by the CPU shown in FIG. 1 for performing control completion determination.

Further, the CPU 51 repeatedly executes the routine for performing the control completion determination shown in FIG. 9 with the passage of each predetermined time (e.g., 6 msec). Accordingly, the CPU 51 initiates processing from step 900 at predetermined timing and proceeds to step 905, and determines whether the value of the control flag CONT has become "1". In a case where it determines "No", it immediately proceeds to step 995 and completes the present routine once.

Now, the present point in time is assumed to be immediately after vehicle stabilization control has been initiated, the CPU 51 determines "Yes" at step 905 because the value of the control flag CONT is maintained at "1", and proceeds to step 910 and determines whether the yaw rate deviation ΔYr is smaller than the completion determination reference value Yrref (positive constant).

Since the present point in time is immediately after vehicle stabilization control has been initiated, the yaw rate deviation ΔYr is a value that is sufficiently larger than the completion determination reference value Yrref. Accordingly, the CPU 51 determines "No" at step 910 and proceeds to step 915 so as to determine whether the value of the reference vehicle body slip angle setting flag SETβref is "1" and the absolute value of the estimated vehicle body slip angle β obtained at the prior step 540 is smaller than the absolute value of the reference vehicle body slip angle βref.

Here, when the value of the reference vehicle body slip angle setting flag SETβref is "1", this indicates that the reference vehicle body slip angle βref is set and when the value is "0", this indicates that the reference vehicle body slip angle βref is not set. As will be explained later, the reference vehicle body slip angle βref is a value that can be set in "time of spin tendency".

At the present time, the vehicle is in "normal time" and the reference vehicle body slip angle βref is not set so the value of the reference vehicle body slip angle setting flag SETβref is "0". Accordingly, the CPU 51 determines "No" at step 915 as well and immediately proceeds to step 995 and completes the present routine once. Thereafter, the CPU 51 repeatedly executes the above-described processing as long as the yaw rate deviation ΔYr is equal to or greater than the completion determination reference value Yrref and the present time is "normal time". During this time, the yaw rate deviation ΔYr decreases gradually.

Next, explanations will be given regarding a case where the value of the yaw rate deviation ΔYr has become smaller than the completion determination reference value Yrref. In this case, the CPU 51 determines "Yes" after proceeding to step 910 and proceeds to step 920 and changes the value of the control flag CONT from "1" to "0". At the next step 925, the CPU 51 issues an instruction for brining all of the solenoid valves of the brake hydraulics control apparatus 30 into an unexcited state. Due to this, vehicle stabilization control is completed.

Subsequently, the CPU 51 proceeds to step 930 and initializes all of the value of the spin tendency detection flag BHV, the reference vehicle body slip angle setting flag SETβref, and the specific operation detection flag DRV to "0", and then proceeds to step 995 so as to end the present routine once. Here, when the value of the specific operation detection flag DRV is "1", this indicates that the specific operation by the driver was detected, and when the value "0", this indicates that the specific operation by the driver was not detected.

As a result, the value of the control flag CONT becomes "0".

Accordingly, the CPU 51 determines "No" when it proceeds to step 905, and immediately ends the present routine once. Further, the CPU 51 determines "No" when it proceeds to step 805 in FIG. 8, and immediately ends the routine of FIG. 8 once.

Furthermore, the CPU 51 determines "Yes" when it proceeds to step 605 in FIG. 6, and restarts setting and renewal of the control threshold value TH in a state where the threshold value coefficient Kth is maintained at "1". Further, the CPU 51 determines "Yes" when it proceeds to step 705 in FIG. 7, and restarts control initiation determination of vehicle stabilization control. When the control initiation conditions have been met (i.e., when a "Yes" determination is made at step 710), the CPU 51 initiates and executes vehicle stabilization control. The above-described processing is repeatedly executed as long as the present time is in "normal time".

Next, the operation will be explained in a case where spin tendency of the vehicle is detected during "normal time", that is, in a case where the "spin tendency time" has come after the normal time. Here, it is assumed that the present point in time is "normal time" (i.e., BHV=0) and vehicle stabilization control is not executed (i.e., CONT=0), and a specific operation by the driver has not been detected (DRV=0).

Figure 10:
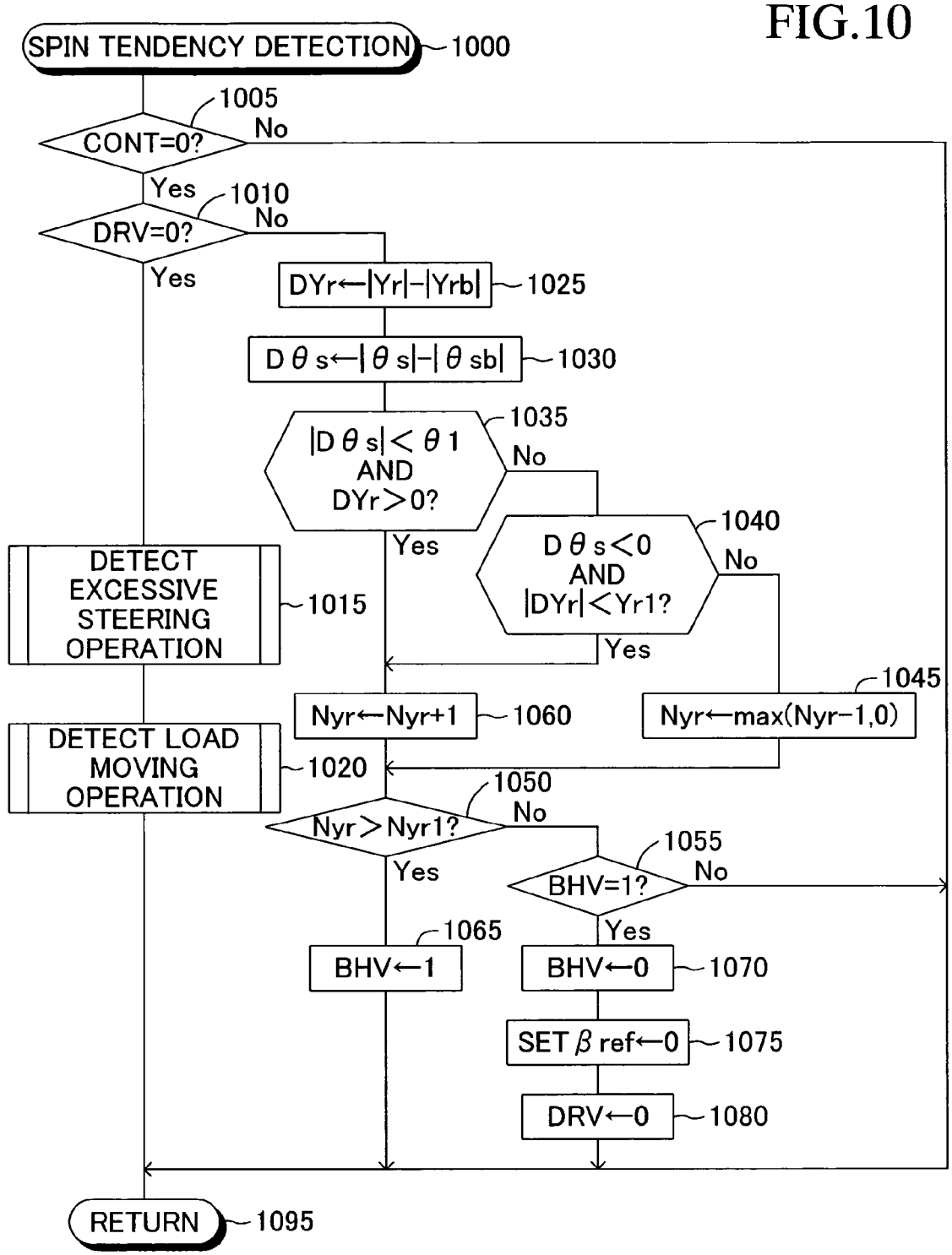
FIG. 10 is a flowchart showing a routine executed by the CPU shown in FIG. 1 for detecting spin tendency.
Figure 11:
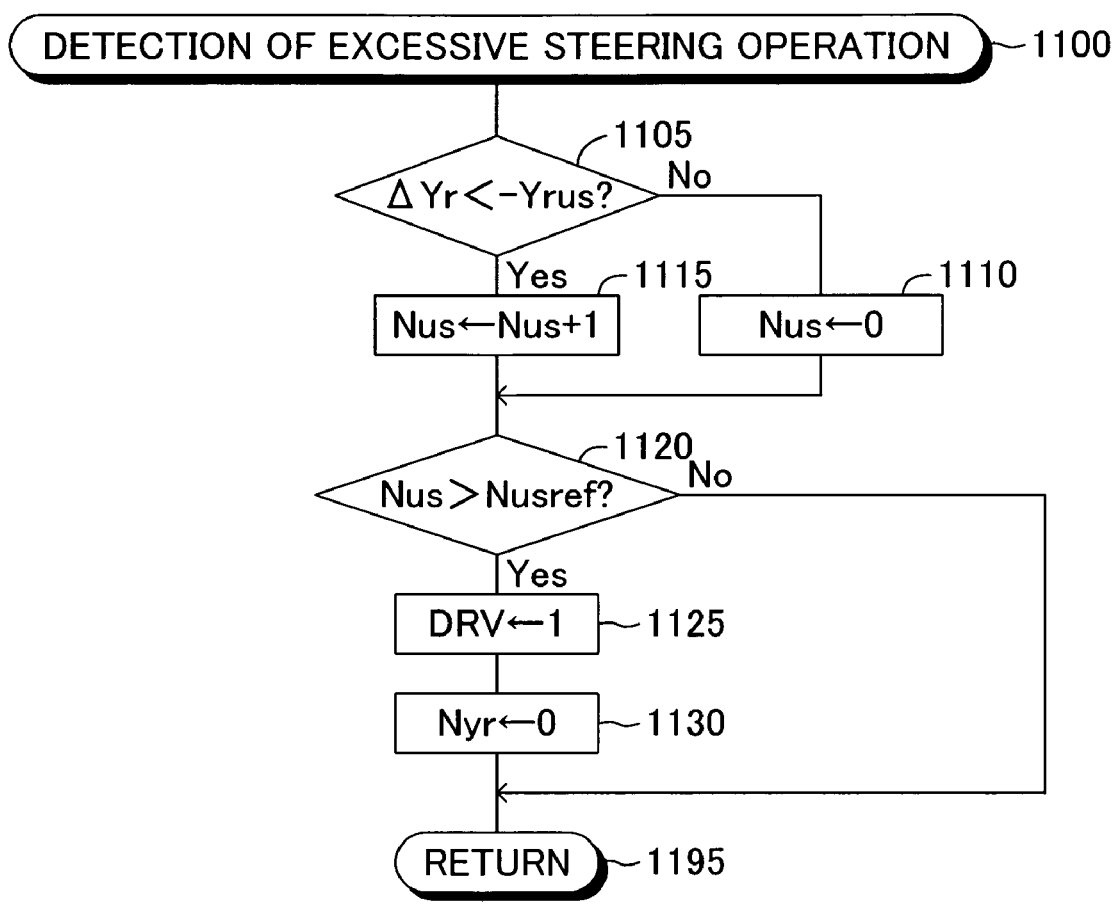
FIG. 11 is a flowchart showing a routine executed by the CPU shown in FIG. 1 for detecting an excessive steering operation.

The CPU 51 repeatedly executes the spin tendency detection routine shown in FIG. 10 at each passage of predetermined time (e.g., 6 msec) in addition to the above-described routines of FIG. 5 to 9. Accordingly, when it reaches a predetermined timing, the CPU 51 initiates processing from step 1000 and proceeds to step 1005, and determines whether the value of the control flag CONT is "0". When it determines "No" (that is, that vehicle stabilization control is in the process of being executed), it immediately proceeds to step 1095 and finishes the present routine once.

At the present point in time, the value of the control flag CONT is "0" so the CPU 51 determines "Yes" at step 1005 and proceeds to step 1010 and determines whether the value of the specific operation detection flag DRV is "0". The CPU 51 determines "Yes" here as well, and initiates processing of the excessive steering operation operation detection routine shown in FIG. 11 via step 1015. This routine in FIG. 11 corresponds to a specific operation determination means.

That is, when the CPU 51 proceeds to step 1105, it determines whether the yaw rate deviation ΔYr calculated at step 530 of FIG. 5 is smaller than the negative predetermined value "−Yrus" (i.e., whether the vehicle is in a state of under-steering). When it has determined "No", the CPU 51 proceeds to step 1110 and resets the value of the counter Nus to "0". On the other hand, when it has determined "Yes", the CPU 51 precedes to step 1115 and increments the value of the counter Nus by "1". That is, the value of the counter Nus indicates the time of continuation of the state of under-steering.

Next, the CPU 51 proceeds to step 1120 and determines whether the value of the counter Nus has exceeded a reference value Nusref corresponding to the aforementioned predetermined time Tusref (i.e., whether time of continuation of the under-steering state has exceeded the predetermined time Tusref) and when it has determined "No", the CPU 51 immediately proceeds to step 1195.

On the other hand, when the CPU 51 determines "Yes" (i.e., in a case where an excessive steering operation operation has been detected), the CPU 51 proceeds to step 1125 and changes the value of the specific operation detection flag DRV from "0" to "1" and after resetting the value of the counter Nyr to "0" at the next step 1130, and then proceeds to step 1195. Here, as will be described later, the value of the counter Nyr indicates a value corresponding to the time of continuation of the aforementioned state of disagreement.

Figure 12:
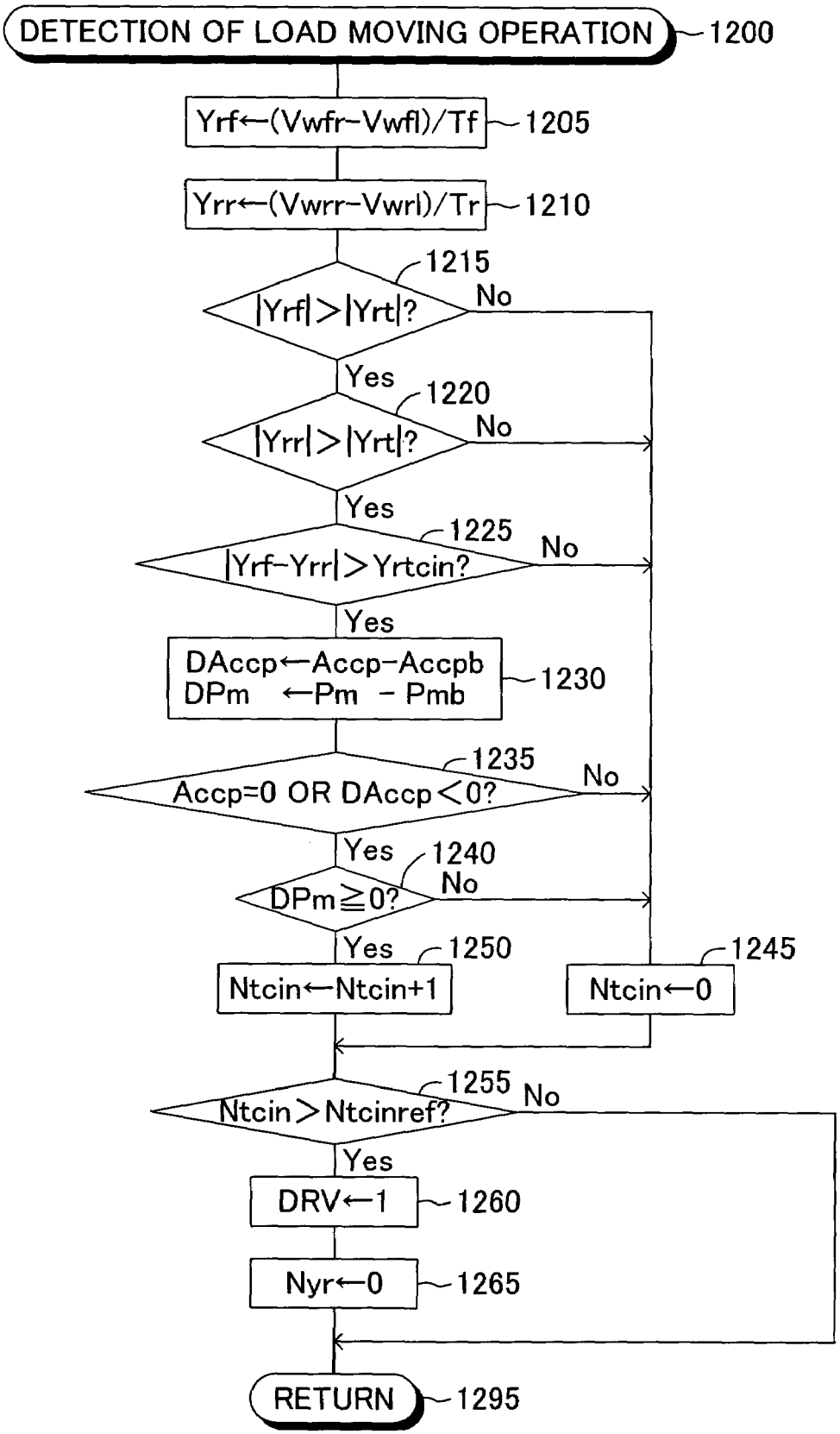
FIG. 12 is a flowchart showing a routine executed by the CPU shown in FIG. 1 for detecting a load moving operation.

When the CPU 51 proceeds to step 1195, it proceeds to step 1020 of FIG. 10 via the same step 1195 and initiates processing load moving operation detection routine shown in FIG. 12 through step 1020. This routine in FIG. 12 also corresponds to the specific operation determination means.

That is, when the CPU 51 proceeds to step 1205, the CPU 51 calculates the yaw rate of the vehicle from the difference between the wheel speeds Vwfr, Vwfl of the front two wheels FR, FL and the specifications of the vehicle, in accordance with the formula recited in the same step 1205 (hereafter, the yaw rate will be called "front-wheel-side wheel yaw rate Yrf"). Here, Tf is the front-wheel-side tread.

Subsequently, the CPU 51 proceeds to step 1210 and calculates the yaw rate of the vehicle from the difference between the wheel speeds Vwrr, Vwrl of the rear two wheels RR, RL and the specifications of the vehicle, in accordance with the formula recited in the same step 1210 (hereafter, the yaw rate will be called "rear-wheel-side wheel yaw rate Yrr"). Here, Tr is the rear-wheel-side tread.

Next, the CPU 51 proceeds to step 1215 and determines at the same steps 1215 to step 1225 whether the vehicle is in a limit turning state. Specifically, the CPU 51 determines whether the absolute value of the front-wheel-side wheel yaw rate Yrf calculated at step 1215 is larger than the absolute value of the steering angle yaw rate Yrt calculated at step 525 of FIG. 5. When the CPU 51 determines "Yes", the CPU 51 determines at the next step 1220 whether the absolute value of the rear-wheel-side wheel yaw rate Yrr is larger than the absolute value of the steering angle yaw rate Yrt.

Further, when the CPU 51 determines "Yes" at step 1220, it proceeds to step 1225 so as to determine whether the difference between the absolute values of the front-wheel-side wheel yaw rate Yrf and the rear-wheel-side wheel yaw rate Yrr is larger than a predetermined positive value Yrtcin.

Here, the satisfaction of all of the determination conditions of step 1215 to step 1225 corresponds to the fact that it has been determined that the vehicle is in a limit turning state. This is due to the following reasons. When a vehicle employing a 4-wheel drive system is in a limit turning state, the load applied to the wheels on the inner side of the turning locus decreases due to centrifugal force, whereby the wheels on the inner side of the turning locus tend to lock in a non-drive state. Accordingly, there is a tendency for the differences between the left and right wheel speeds in a non-drive state (that is, the absolute values of the wheel speed yaw rates Yrf, Yrr) to become larger. That is, |Yrf|>|Yrt| and |Yrr|>|Yrt| are fulfilled.

In addition, in a case where a four-wheel drive vehicle is in a limit turning state and is traveling on a high-μ road surface whose friction coefficient μ is a relatively high, in a non-drive state (braking state) the load on the rear wheel on the inner side of the turning locus becomes less than the load on the front wheel on the inner side of the turning locus due to the amount of load movement to the front wheels increasing. As a result, there is a greater tendency for the rear wheel on the inner side of the turning locus to lock than front wheel on the inner side of the turning locus. This means that there is a tendency for the rear-wheel-side wheel yaw rate Yrr to be greater than the front-wheel-side wheel yaw rate Yrf.

On the other hand, in a case where a four-wheel drive vehicle is in a limit turning state and is traveling on a low-μ road surface whose friction coefficient μ is a relatively small, compared to when traveling on a high μ road surface, the tire slip angle (i.e., the angle formed between the direction of the central plane of the tire and the heading direction of the same tire) necessary for maintaining cornering force becomes larger. Further, the tire slip angle of the front wheels, which are the steerable wheels, becomes larger than the tire slip angle of the rear wheels. Here, generally the larger the tire slip angle is, the larger the tire slip rate necessary for obtaining the same fore-aft force (i.e., the force generated in the heading direction of the tire; the braking force) becomes. This means that there is a tendency for the front-wheel-side wheel yaw rate Yrf to be greater than the rear-wheel-side wheel yaw rate Yrr.

Thus, in the case where a 4-wheel drive vehicle is in a limit turning state, the conditions "|Yrf−Yrr|>Yrtcin" are fulfilled, no matter which road surface the vehicle is traveling on. Accordingly, with the present example, if all of the determining conditions of steps 1215 to 1225 are fulfilled, it is determined that the vehicle is in a limit turning state.

When the CPU 51 determines that the vehicle is not in a limit turning state (i.e., when any one of the determination conditions of step 1215 to step 1225 has been established) the CPU 51 proceeds to step 1245 and resets the value of the counter Ntcin to "0".

On the other hand, when the CPU 51 determines that the vehicle is in a limit turning state, the CPU 51 proceeds to step 1230 and stores, as the accelerator pedal operation change amount DAccp, a value obtained by subtracting from the accelerator pedal operation amount Accpb at the present point in time the previous accelerator pedal operation amount Accp stored in the previously described step 550. In step 1230, the CPU 51 also stores, as the master cylinder pressure change amount DPm, a value obtained by subtracting from the master cylinder pressure Pm at the present point in time the previous master cylinder pressure Pmb stored in the previously described step 550.

Next, the CPU 51 proceeds to step 1235 and determines whether the condition that the accelerator pedal operation amount Accp at the present point in time is "0" or the condition that the value of the above accelerator pedal operation change amount DAccp is negative (that is, an operation of releasing the AP is being performed) is satisfied. When the CPU 51 determines "Yes", it proceeds to step 1240 so as to determine whether the above master cylinder pressure change amount DPm is "0" or grater (i.e., whether an operation of pressing the brake pedal BP is being performed).

If either one of the determination conditions of steps 1235 and 1240 is not fulfilled, the CPU 51 proceeds to step 1245 and resets the value of the counter Ntcin to "0". However, if both of the determination conditions of steps 1235 and 1240 have been fulfilled, the CPU 51 precedes to step 1250 and increments the value of the counter Ntcin by "1". In other words, the value of the counter Ntcin indicates the continuation time of the releasing of the accelerator pedal AP or the pressing of the brake pedal BP during the period where the limit turning state of the vehicle is being detected.

Subsequently, the CPU 51 proceeds to step 1255 and determines whether the value of the counter Ntcin has exceeded the reference value Ntcinref corresponding to the aforementioned predetermined time Ttcinref (accordingly, whether the continuing time of the operation of releasing the accelerator pedal AP or the operation of pressing the brake pedal BP has exceeded the predetermined time Ttcinref). When the CPU 51 has determined "No", it proceeds to step 1295.

On the other hand, if the CPU 51 determines "Yes" (i.e., a case where a load moving operation has been detected) it proceeds to step 1260 and changes the value of the specific operation detection flag DRV from "0" to "1" and after resetting the value of the counter Nyr to "0" at the next step 1265, proceeds to step 1295.

When the CPU 51 proceeds to step 1295, it proceeds to step 1095 of FIG. 10 via the step 1295 and finishes the routine of FIG. 10 once. That is, the CPU 51, which repeatedly executes the routine of FIG. 10 at the passage of each predetermined time, continues to determine "Yes" at step 1010, and repeatedly executes the routines of FIGS. 11 and 12, because the value of the specific operation detection flag DRV is maintained at "0" as long as none of an excessive steering operation by the driver and a load moving operation is detected.

Next, a case will be explained where either one of an excessive steering operation by the driver and a load moving operation is detected.

In this case, the value of the counter Nyr has been reset to "0" with the processing of the previous step 1130 or 1265. Further, the value of the specific operation detection flag DRV is changed to "1" with the processing of the previous step 1125 or 1260.

In this case, the CPU 51 determines "No" when it proceeds to step 1010, and proceeds to step 1025 so as to set, as the actual yaw rate change amount DYr, a value obtained by subtracting the absolute value of the previous actual yaw rate Yrb stored at the previously described step 545 from the absolute value of the actual yaw rate Yr at the present point in time. At the next step 1030, the CPU 51 sets, as the steering angle change amount Dθs, a value obtained by subtracting the absolute value of the previous steering angle θsb stored at the previously described step 545 from the absolute value of the steering angle θs at the present point in time.

Subsequently, the CPU 51 proceeds to step 1035 and determines whether the absolute value of the above steering angle change amount Dθs is smaller than a very small value θ1 (positive value) and the above actual yaw rate change amount DYr is greater than "0" (i.e., whether the steering angle θs is maintained to be substantially constant and the absolute value of the actual yaw rate Yr is increasing) and when it has determined "No", proceeds to step 1040.

When the CPU 51 proceeds to step 1040, the CPU 51 determines whether the above steering angle change amount Dos is less than "0" and the absolute value of the actual yaw rate change amount DYr is less than a very small value Yrl (positive value) (i.e., whether the absolute value of the steering angle θs is getting smaller and the actual yaw rate Yr is maintained to be substantially constant, and a state of disagreement is occurring between the θs and the actual yaw rate Yr). When the CPU 51 has determined "No" here as well, it precedes to step 1045 and decrements the value of the counter Nyr by "1" such that it remains in a range not less than "0".

On the other hand, when the CPU 51 determines "Yes" at either step 1035 or step 1040, it proceeds to step 1060 and increment the value of the counter Nyr by "1". In other words, as described above, the value of the counter Nyr indicates a value corresponding to the above continuation time of the state of disagreement.

Next, when the CPU 51 proceeds to step 1050, it determines whether the value of the counter Nyr has exceeded the reference value Nyrl that corresponds to the above predetermined time Tyrref (accordingly, whether the above continuation time of the state of disagreement has exceeded the predetermined time Tyrref).

Now, the value of the counter Nyr is assumed not to be greater than the reference value Nyrl. In this case, the CPU 51 determines "No" at step 1050, proceeds to step 1055, and determines whether the value of the spin tendency detection flag BHV is "1". At the present point in time, the value of the spin tendency detection flag BHV is "0". Accordingly, the CPU 51 determines "No" at step 1055 and immediately proceeds to step 1095 where it finishes the present routine once.

Thereafter, the CPU 51 continues to determine "No" at step 1010 and determine "No" at steps 1050 and 1055, as long as the value of the counter Nyr is not greater than the reference value Nyrl. During this time, the above state of disagreement continues due to the occurrence of spin tendency caused by a specific operation by the driver (i.e., the value of the counter Nyr increases).

As a result, when a predetermined amount of time passes and the value of the counter Nyr exceeds the reference value Nyrl (i.e., when the specific operation is detected), the CPU 51 determines "Yes" when it proceeds to step 1050 and proceeds to step 1065, and changes the value of the spin tendency detection flag BHV from "0" to "1", and then proceeds to step 1095 and ends the present routine once. Due to this, the spin tendency of the vehicle is detected (i.e., it moves from "normal time (BHV=0)" to "spin tendency time (BHV=1)").

In this manner, the value of the counter Nyr exceeding the reference value Nyrl means that a specific operation by the driver and a specific behavior are continuously detected in this order. Accordingly, step 1050 both corresponds to the specific behavior determination means and the spin tendency determination means.

Thereafter, the CPU 51 repeatedly executes either step 1060 or step 1045 as long as vehicle stabilization control is not initiated (control flag CONT=0) (and as long as the specific operation detection flag DRV≠0). As a result, during the continuation of the above state of disagreement (and accordingly, the specific behavior), the value of the counter Nyr increases "1" at a time, and after the state of disagreement (and accordingly, the specific behavior) ends because of a certain cause, the value of the counter Nyr decreases "1" at a time.

Meanwhile, as the value of the spin tendency detection flag BHV is changed from "0" to "1" in this manner (i.e., when it becomes "spin tendency time"), the CPU 51, which repeatedly executes the routine of FIG. 6 at the passage of each predetermined time, determines "Yes" when it proceeds to step 620 and proceeds to step 635 instead of step 625.

When the CPU 51 proceeds to step 635, it determines the value of the threshold value coefficient Kth (0.5≦Kth≦1.0) based on the table recited in the above-described step 635 and on the value of the counter Nyr at the present point in time. Due to this, the threshold value coefficient Kth (and thus the control threshold value TH) can be set to a value smaller than when compared during "normal time". Further, the larger the value of the counter Nyr becomes, the smaller the value of the threshold value coefficient kth becomes. This means that the longer the continuation time of the above disagreement state, the smaller the value of the control threshold value TH is set. Step 635 corresponds to the threshold value lowering means.

As a result, the control initiation conditions (ΔYr>TH) become easier to be satisfied when the CPU 51, which repeatedly executes the routine of FIG. 7 with the passage of every predetermined time, performs control initiation determination at step 710. As a result, the CPU 51 becomes more likely to determine "Yes" at step 710 and execute step 720. Due to this, vehicle stabilization control can be initiated faster than during "normal time".

Moreover, in a case where the above control initiation conditions are not fulfilled, the CPU 51 determines "No" at step 710, proceeds to step 715, determines whether the value of the spin tendency detection flag BHV is "1", determines "Yes", and proceeds to step 725.

When the CPU 51 proceeds to step 725, it determines whether the value of the reference vehicle body slip angle setting flag SETβref is "1". At the present point in time, the reference vehicle body slip angle βref is not set and the value of the SETβref is "0" so the CPU 51 determines "No" at step 725, proceeds to step 730, and determines whether the yaw rate deviation ΔYr exceeds half the value of the control threshold value TH. When the CPU 51 determines "No", it proceeds to step 795.

On the other hand, if the CPU 51 determines "Yes" at step 730, it proceeds to step 735 and stores, as the reference vehicle body slip μ, the value of the estimated vehicle body slip angle β at the present point in time calculated at step 540 of FIG. 5, and changes the value of the reference vehicle body slip angle setting flag SETβref from "0" to "1" at the next step 740.

As a result, after that, when the above-described control start condition in step 710 is not satisfied, the CPU 51 determines "Yes" when it proceeds to step 725, and then proceeds step 745 in order to determines whether a value obtained by subtracting the absolute value of the above reference vehicle body slip angle βref from the absolute value of the estimated vehicle body slip angle β at the present point in time has exceeded the predetermined positive value β1.

Then when the CPU 51 determines "Yes" at step 745, it proceeds to step 720. That is, even in a case where the above control initiation conditions (ΔYr>TH) have not been fulfilled at step 710, vehicle stabilization control is initiated when the absolute value of the estimated vehicle body slip angle β is increasing. Due to this as well, the vehicle stabilization control can be initiated faster than during "normal time".

In this manner, when step 720 is executed (i.e., when the control flag CONT=1), the CPU 51 repeatedly executes the routine of FIG. 8 just as in a case of the above-described "normal time", whereby the CPU 51 executes vehicle stabilization control and monitors at step 910 of the routine in FIG. 9 whether the control completion conditions are fulfilled.

When the control end condition in step 910 is satisfied, the CPU 51 executes the processing of steps 920 to 930. As a result, the value of the spin tendency detection flag BHV is changed from "1" to "0" (accordingly, the operation mode is shifted from that for "spin tendency time" to that for "normal time"). As a result, the above-described operation for the normal time is resumed.

In addition, the value of the specific operation detection flag DRV is changed from "1" to "0". As a result, the CPU 51, which repeatedly executes the routine of FIG. 10, thus determines "Yes" at step 1010, whereby detection of a specific operation by the driver (steps 1015 and 1020) is reinitiated.

Further, in the case where vehicle stabilization control has been initiated and executed (i.e., the control flag CONT=1) in a state where the value of the above reference vehicle body slip angle βref is set (i.e., a state where the reference vehicle body slip angle setting flag SETβref=1), even if the CPU 51, which repeatedly executes the routine of FIG. 9, determines "No" when it proceeds to step 910, the CPU 51 proceeds to step 915 and determines "Yes" when the absolute value of the estimated vehicle body slip angle β at the present point in time is smaller than the absolute value of the above reference vehicle body slip βref. In this case, the CPU 51 proceeds to step 920.

In this case, vehicle stabilization control is finished even when the control completion conditions (ΔYr<Yrref) in step 910 are not fulfilled.

It should be noted that even in a case where a "Yes" determination is made at step 1050 of FIG. 10 and where the value of the spin tendency detection flag BHV is changed from "0" to "1" at step 1065 (i.e., a case where the system has moved from "normal time" to "time of spin tendency"), a "Yes" determination is not made after that at step 710 or step 745. As a result, there are cases where vehicle stabilization control is not initiated even after the passage of a relatively long period of time.

In such a case, the state of disagreement (and thus the specific behavior) that was initiated and continued by the specific operation by the driver finishes in a state where vehicle stabilization control is not initiated. As a result, the value of the counter Nyr is decremented by "1" at a time due to the repeated execution of step 1045.

In this case, when a predetermined amount of time has passed and the value of the counter Nyr becomes equal to or less than the reference value Nyrl, the CPU 51 proceeds to step 1055 from step 1050, determines "Yes" at the step 1055, and executes the processing of steps 1070 to 1080 (i.e., the same processing as the previous step 930). As a result, the value of the spin tendency detection flag BHV is changed from "1" to "0" without vehicle stabilization control being initiated and executed (i.e., the operation mode is shifted from that for "spin tendency time" to that for "normal time"). Due to this, the operation during the above-described "normal time" is reinitiated.

As explained above, the motion control apparatus of the vehicle which can execute vehicle stabilization control (over-steering suppression control) of the embodiment of the present invention determines that the vehicle is experiencing spin tendency when the apparatus detects either an excessive steering operation or a load moving operation, each of which is "specific operation" by the driver and induces spin tendency of the vehicle (refer to step 1125 or step 1260) and then detects that a "specific behavior" indicating spin tendency has been occurred in the vehicle (see step 1065).

Accordingly, the occurrence of relatively slow spin tendency caused by the above "specific operation" by the driver can be detected with certainty. Further, when spin tendency has been detected, the control initiation conditions of the vehicle stabilization control are changed to conditions where control can be more easily initiated (refer to step 635 and step 745). As a result, when spin tendency is detected, vehicle stabilization control can be initiated and executed early so vehicle stability can be maintained.

The present invention is not limited to the above-described embodiment, and various modifications can be employed within the scope of the present invention. For example, the apparatus of the above-described embodiment is configured such that when spin tendency is detected (i.e., at the time of spin tendency), vehicle stabilization control is executed only when the control initiation conditions during the time of spin tendency (refer to steps 635, 710, and 745) are fulfilled. However, the apparatus may be configured such that when spin tendency is detected (see step 1065) vehicle stabilization control is immediately initiated and executed.

Further, the apparatus of the above-described embodiment is configured so as to detect an excessive steering operation by the driver with the condition that the vehicle is in a state of under-steering. However, the apparatus may be configured so as to detect an excessive steering operation by the driver with the condition that the steering torque T of the steering wheel ST is decreasing, by making use of the phenomenon that when the vehicle is in a state of under-steering, the steering torque T of the steering wheel ST decreases.

In this case, the apparatus may be configured to include a torque sensor that detects the actual steering torque T and a predetermined table MapTref (Vso, θs) for obtaining a reference steering torque Tref in which the estimated vehicle body speed Vso and the steering angle θs are used as arguments, and is configured to detect the excessive steering operation with the condition that the actual steering torque T becomes smaller than the reference steering torque Tref=MapTref (Vso, θs) by a predetermined amount.

Further, the apparatus of the above-described embodiment is configured so as to detect a specific behavior when the behavior of the steering angle θs and the behavior of the actual yaw rate Yr are in disagreement with each other, however, it can be configured so as to detect a specific behavior when the behavior of the steering angle yaw rate Yrt and the behavior of the actual yaw rate Yr are in disagreement with each other.

In this case, in steps 1030 to 1040, in place of the "steering angle change amount Dθs", the steering angle yaw rate change amount DYrt is used, which is a value obtained by subtracting the absolute value of the previous steering angle yaw rate Yrtb from the absolute value of the steering angle yaw rate Yrt.

In the above-described embodiment, a constant value is used as the reference value Nyrl (see step 1050), which is compared with the value of the counter Nyr that represents the continuation time of the state of disagreement between the behavior of the steering angle θs and the behavior of the actual yaw rate Yr. However, the reference value Nyrl may be changed in accordance with the traveling state of the vehicle.

In this case, the reference value Nyrl is preferably set to a smaller value when the absolute value of the actual lateral acceleration Gy, the absolute value of the actual yaw rate Yr, or the estimated vehicle body speed Vso increases, because the level of the need for detecting spin tendency early increases.

The apparatus of the above-described embodiment is configured to determine that the driver has performed a load moving operation with the condition that an operation of returning the accelerator pedal Ap or pressing the brake pedal BP continues over the predetermined time Ttcinref. However, in addition to the above-mentioned condition, there may be employed another condition that the vehicle deceleration (e.g., the absolute value of the time-differentiated value of the estimated vehicle body speed Vso) increases continuously.

The above-described embodiment, the apparatus is configured to determine that the four-wheel-drive-type vehicle is in a limit turning state when all the determination conditions of steps 1215 to 1225 of FIG. 12 are satisfied. However, the apparatus may be configured to determine that the four-wheel-drive-type vehicle is in a limit turning state not only when the above-described conditions are satisfied but also when the vehicle is in a driven state (the accelerator operation amount Accp>0) and the wheel speeds of the front and rear wheels located inside a turning locus are higher than those of the corresponding wheels located outside the turning locus.

What is claimed is:

1. A motion control apparatus for a vehicle, comprising:
over-steering degree obtaining means for obtaining a value indicating the degree of over-steering in a turning state of the vehicle;
stabilization control executing means for executing vehicle stability control when the value indicating the degree of over-steering exceeds a threshold value, the vehicle stability control applying braking force to at least one predetermined wheel of the vehicle in order to generate a yawing moment in the vehicle in a direction opposite a yawing direction of the vehicle;
specific operation determining means for determining that a specific operation that induces spin tendency of the vehicle has been performed by a driver when the driver has performed a load moving operation that increases a load acting on wheels on the front side of the vehicle body of the vehicle;
specific behavior determining means for determining that a specific behavior representing spin tendency of the vehicle has occurred in the vehicle when the specific behavior determining means has detected a state in which a turning angle of a steerable wheel of the vehicle is becoming smaller due to a steering operation by the driver and yaw rate of the vehicle is maintained to be substantially constant or a state in which the turning angle of the steerable wheel is maintained to be substantially constant due to a steering operation by the driver and the yaw rate of the vehicle is increasing;
storing means for storing the fact that the specific operation is determined to have been performed;
spin tendency determining means for determining that the vehicle is experiencing spin tendency when the specific behavior is determined to have occurred in the vehicle in a state in which the fact that the specific operation is determined to have been performed is stored by the storing means; and
threshold value lowering means for lowering the threshold value when the spin tendency determining means determines that the vehicle is experiencing spin tendency.

2. A motion control apparatus for a vehicle according to claim 1, wherein the threshold value lowering means is configured to change a degree, to which the threshold value is lowered, in accordance with a degree of spin tendency of the vehicle represented by the specific behavior.

3. A motion control apparatus for a vehicle according to claim 2, further comprising vehicle body slip angle obtaining means for obtaining a vehicle body slip angle of the vehicle, and the stabilization control executing means is configured such that, in a case where the vehicle has been determined to be experiencing spin tendency, the stabilization control executing means initiates and executes the vehicle stabilization control when the vehicle body slip angle is increasing, even when the value indicating the degree of over-steering is not greater than the threshold value lowered by the threshold value lowering means.

4. A motion control apparatus for a vehicle according to claim 3, wherein the stabilization control executing means is configured such that in a case where the vehicle has been determined to be experiencing spin tendency, the stabilization control executing means initiates and executes the vehicle stabilization control when the vehicle body slip angle increases by a predetermined amount from the vehicle body slip angle obtained when the value indicating the degree of over-steering has exceeded a value which is smaller by a predetermined amount than the threshold value lowered by the threshold value lowering means.

5. A motion control apparatus for a vehicle according to claim 1, wherein the specific operation determining means is configured to determine that the load moving operation has been performed when the driver performs an operation of releasing an accelerator pedal or an operation of pressing a brake pedal.

6. A motion control apparatus for a vehicle according to claim 5, wherein the specific operation determining means is configured to determine that the load moving operation has been performed when the vehicle is in a limit turning state and the driver has performed the operation of releasing the accelerator pedal or the operation of pressing the brake pedal.

7. A motion control apparatus for a vehicle according to claim 6, wherein the specific operation determining means is configured to determine that the vehicle is in the limit turning state on the basis of wheel speeds of the vehicle and the yaw rate of the vehicle calculated from a vehicle body speed of the vehicle and a steering angle.

8. A motion control apparatus for a vehicle according to claim 1, further comprising vehicle body slip angle obtaining means for obtaining a vehicle body slip angle of the vehicle, and the stabilization control executing means is configured such that, in a case where the vehicle has been determined to be experiencing spin tendency, the stabilization control executing means initiates and executes the vehicle stabilization control when the vehicle body slip angle is increasing, even when the value indicating the degree of over-steering is not greater than the threshold value lowered by the threshold value lowering means.

9. A motion control apparatus for a vehicle according to claim 8, wherein the stabilization control executing means is configured such that in a case where the vehicle has been determined to be experiencing spin tendency, the stabilization control executing means initiates and executes the vehicle stabilization control when the vehicle body slip angle increases by a predetermined amount from the vehicle body slip angle obtained when the value indicating the degree of over-steering has exceeded a value which is smaller by a predetermined amount than the threshold value lowered by the threshold value lowering means.

10. A motion control apparatus for a vehicle, comprising:
    over-steering degree obtaining means for obtaining a value indicating the degree of over-steering in a turning state of the vehicle;
    stabilization control executing means for executing vehicle stability control when the value indicating the degree of over-steering exceeds a threshold value, the vehicle stability control applying braking force to at least one predetermined wheel of the vehicle in order to generate a yawing moment in the vehicle in a direction opposite a yawing direction of the vehicle;
    specific operation determining means for determining that a specific operation that induces spin tendency of the vehicle has been performed by a driver when a turning state of the vehicle becomes a state of under-steering due to the driver's excessive steering operation in a turning direction;
    specific behavior determining means for determining that a specific behavior representing spin tendency of the vehicle has occurred in the vehicle when the specific behavior determining means has detected a state in which a turning angle of a steerable wheel of the vehicle is becoming smaller due to a steering operation by the driver and yaw rate of the vehicle is maintained to be substantially constant or a state in which the turning angle of the steerable wheel is maintained to be substantially constant due to a steering operation by the driver and the yaw rate of the vehicle is increasing;
    storing means for storing the fact that the specific operation is determined to have been performed;
    spin tendency determining means for determining that the vehicle is experiencing spin tendency when the specific behavior is determined to have occurred in the vehicle in a state in which the fact that the specific operation is determined to have been performed is stored by the storing means; and
    threshold value lowering means for lowering the threshold value when the spin tendency determining means determines that the vehicle is experiencing spin tendency.

11. A motion control apparatus for a vehicle according to claim 10, wherein the threshold value lowering means is configured to change a degree, to which the threshold value is lowered, in accordance with a degree of spin tendency of the vehicle represented by the specific behavior.

12. A motion control apparatus for a vehicle according to claim 11, further comprising vehicle body slip angle obtaining means for obtaining a vehicle body slip angle of the vehicle, and the stabilization control executing means is configured such that, in a case where the vehicle has been determined to be experiencing spin tendency, the stabilization control executing means initiates and executes the vehicle stabilization control when the vehicle body slip angle is increasing, even when the value indicating the degree of over-steering is not greater than the threshold value lowered by the threshold value lowering means.

13. A motion control apparatus for a vehicle according to claim 12, wherein the stabilization control executing means is configured such that in a case where the vehicle has been determined to be experiencing spin tendency, the stabilization control executing means initiates and executes the vehicle stabilization control when the vehicle body slip angle increases by a predetermined amount from the vehicle body slip angle obtained when the value indicating the degree of over-steering has exceeded a value which is smaller by a predetermined amount than the threshold value lowered by the threshold value lowering means.

14. A motion control apparatus for a vehicle according to claim 10, further comprising vehicle body slip angle obtaining means for obtaining a vehicle body slip angle of the vehicle, and the stabilization control executing means is configured such that, in a case where the vehicle has been determined to be experiencing spin tendency, the stabilization control executing means initiates and executes the vehicle stabilization control when the vehicle body slip angle is increasing, even when the value indicating the degree of over-steering is not greater than the threshold value lowered by the threshold value lowering means.

15. A motion control apparatus for a vehicle according to claim 14, wherein the stabilization control executing means is configured such that in a case where the vehicle has been determined to be experiencing spin tendency, the stabilization control executing means initiates and executes the vehicle stabilization control when the vehicle body slip angle increases by a predetermined amount from the vehicle body slip angle obtained when the value indicating the degree of over-steering has exceeded a value which is smaller by a predetermined amount than the threshold value lowered by the threshold value lowering means.

16. A motion control apparatus for a vehicle, comprising:
    specific operation determining means for determining that a specific operation that induces spin tendency of the vehicle has been performed by a driver when the driver has performed a load moving operation that increases a load acting on wheels on the front side of the vehicle body of the vehicle;
    specific behavior determining means for determining that a specific behavior representing spin tendency of the vehicle has occurred in the vehicle when the specific behavior determining means has detected a state in which a turning angle of a steerable wheel of the vehicle is becoming smaller due to a steering operation by the driver and yaw rate of the vehicle is maintained to be substantially constant or a state in which the turning angle of the steerable wheel is maintained to be substantially constant due to a steering operation by the driver and the yaw rate of the vehicle is increasing;
    storing means for storing the fact that the specific operation is determined to have been performed;

spin tendency determining means for determining that the vehicle is experiencing spin tendency when the specific behavior is determined to have occurred in the vehicle in a state in which the fact that the specific operation is determined to have been performed is stored by the storing means; and stabilization control executing means for executing vehicle stability control when the spin tendency determining means determines that the vehicle is experiencing spin tendency, the vehicle stability control applying a braking force to at least one predetermined wheel of the vehicle in order to generate a yawing moment in the vehicle in a direction opposite a yawing direction of the vehicle.

17. A motion control apparatus for a vehicle according to claim 16, wherein the specific operation determining means is configured to determine that the load moving operation has been performed when the driver performs an operation of releasing an accelerator pedal or an operation of pressing a brake pedal.

18. A motion control apparatus for a vehicle according to claim 17, wherein the specific operation determining means is configured to determine that the load moving operation has been performed when the vehicle is in a limit turning state and the driver has performed the operation of releasing the accelerator pedal or the operation of pressing the brake pedal.

19. A motion control apparatus for a vehicle according to claim 18, wherein the specific operation determining means is configured to determine that the vehicle is in the limit turning state on the basis of wheel speeds of the vehicle and the yaw rate of the vehicle calculated from a vehicle body speed of the vehicle and a steering angle.

20. A motion control apparatus for a vehicle, comprising:

specific operation determining means for determining that a specific operation that induces spin tendency of the vehicle has been performed by a driver when a turning state of the vehicle becomes a state of under-steering due to the driver's excessive steering operation in a turning direction;

specific behavior determining means for determining that a specific behavior representing spin tendency of the vehicle has occurred in the vehicle when the specific behavior determining means has detected a state in which a turning angle of a steerable wheel of the vehicle is becoming smaller due to a steering operation by the driver and yaw rate of the vehicle is maintained to be substantially constant or a state in which the turning angle of the steerable wheel is maintained to be substantially constant due to a steering operation by the driver and the yaw rate of the vehicle is increasing;

storing means for storing the fact that the specific operation is determined to have been performed;

spin tendency determining means for determining that the vehicle is experiencing spin tendency when the specific behavior is determined to have occurred in the vehicle in a state in which the fact that the specific operation is determined to have been performed is stored by the storing means; and stabilization control executing means for executing vehicle stability control when the spin tendency determining means determines that the vehicle is experiencing spin tendency, the vehicle stability control applying a braking force to at least one predetermined wheel of the vehicle to generate a yawing moment in the vehicle in a direction opposite a yawing direction of the vehicle.

* * * * *